(12) United States Patent
Roberts et al.

(10) Patent No.: US 8,179,946 B2
(45) Date of Patent: May 15, 2012

(54) SYSTEMS AND METHODS FOR CONTROL OF ADVANCED RECEIVERS

(75) Inventors: Brian Lee Roberts, Boulder, CO (US); Kenneth C Grobaski, Lyons, CO (US); Anand P Narayan, Lafayette, CO (US)

(73) Assignee: Rambus Inc., Sunnyvale, CA (US)

( * ) Notice: Subject to any disclaimer, the term of this patent is extended or adjusted under 35 U.S.C. 154(b) by 759 days.

(21) Appl. No.: 12/274,551

(22) Filed: Nov. 20, 2008

(65) Prior Publication Data
US 2009/0141776 A1 Jun. 4, 2009

Related U.S. Application Data

(63) Continuation-in-part of application No. 10/669,954, filed on Sep. 23, 2003, now Pat. No. 7,787,518.

(60) Provisional application No. 60/989,449, filed on Nov. 21, 2007.

(51) Int. Cl.
H04B 1/00 (2006.01)
(52) U.S. Cl. ........................................ 375/144; 375/130
(58) Field of Classification Search .................. 375/144, 375/130, 148, 346, 284, 285; 370/479, 343, 370/335, 441; 455/562.1, 442, 513
See application file for complete search history.

(56) References Cited

U.S. PATENT DOCUMENTS

| | | | |
|---|---|---|---|
| 3,742,201 A | 6/1973 | Groginsky | 235/156 |
| 4,088,955 A | 5/1978 | Baghdady | 325/56 |
| 4,309,769 A | 1/1982 | Taylor, Jr. | 375/1 |
| 4,359,738 A | 11/1982 | Lewis | 343/100 |
| 4,601,046 A | 7/1986 | Halpern et al. | 375/38 |
| 4,665,401 A | 5/1987 | Garrard et al. | 342/75 |
| 4,670,885 A | 6/1987 | Parl et al. | 375/1 |
| 4,713,794 A | 12/1987 | Byington et al. | 365/45 |
| 4,780,885 A | 10/1988 | Paul et al. | 375/40 |
| 4,856,025 A | 8/1989 | Takai | 375/40 |
| 4,893,316 A | 1/1990 | Janc et al. | 375/44 |
| 4,922,506 A | 5/1990 | McCallister et al. | 375/1 |
| 4,933,639 A | 6/1990 | Barker | 324/309 |
| 4,965,732 A | 10/1990 | Roy, III et al. | 364/460 |
| 5,017,929 A | 5/1991 | Tsuda | 342/427 |
| 5,099,493 A | 3/1992 | Zeger et al. | 375/1 |
| 5,105,435 A | 4/1992 | Stilwell | 375/1 |

(Continued)

FOREIGN PATENT DOCUMENTS
DE 4201439 7/1993
(Continued)

OTHER PUBLICATIONS

Scharf, et al., "Matched Subspace Detectors," IEEE Transactions on Signal Processing, vol. 42, No. 8, Aug. 1994. 12 pages.

(Continued)

*Primary Examiner* — Khai Tran
(74) *Attorney, Agent, or Firm* — Barcelo, Harrison & Walker LLP

(57) ABSTRACT

A controller for advanced receivers configures a plurality of advanced receiver modules based on figures of merit computed on the input signal. The controller also selects the appropriate output signal based on figures of merit of either the input or the output signals. The controller decisions can also be made in a bursty manner, where only a subset of the decisions to be made are made at a given time, thereby limiting the processing load of the control processor.

14 Claims, 28 Drawing Sheets

U.S. PATENT DOCUMENTS

| | | | | |
|---|---|---|---|---|
| 5,109,390 A | 4/1992 | Gilhousen et al. | | 375/1 |
| 5,119,401 A | 6/1992 | Tsujimoto | | 375/14 |
| 5,136,296 A | 8/1992 | Roettger et al. | | 342/26 |
| 5,151,919 A | 9/1992 | Dent | | 375/1 |
| 5,218,359 A | 6/1993 | Minamisono | | 342/383 |
| 5,218,619 A | 6/1993 | Dent | | 375/1 |
| 5,220,687 A | 6/1993 | Ichikawa et al. | | 455/254 |
| 5,224,122 A | 6/1993 | Bruckert | | 375/1 |
| 5,237,586 A | 8/1993 | Bottomley | | 375/1 |
| 5,263,191 A | 11/1993 | Kickerson | | 455/304 |
| 5,280,472 A | 1/1994 | Gilhousen et al. | | 370/18 |
| 5,305,349 A | 4/1994 | Dent | | 375/1 |
| 5,325,394 A | 6/1994 | Bruckert | | 375/1 |
| 5,343,493 A | 8/1994 | Karimullah | | 375/1 |
| 5,343,496 A | 8/1994 | Honig et al. | | 375/1 |
| 5,347,535 A | 9/1994 | Karasawa et al. | | 375/1 |
| 5,353,302 A | 10/1994 | Bi | | 375/1 |
| 5,377,183 A | 12/1994 | Dent | | 370/18 |
| 5,386,202 A | 1/1995 | Cochran et al. | | 332/100 |
| 5,390,207 A | 2/1995 | Fenton et al. | | 375/1 |
| 5,394,110 A | 2/1995 | Mizoguchi | | 329/304 |
| 5,396,256 A | 3/1995 | Chiba et al. | | 342/372 |
| 5,437,055 A | 7/1995 | Wheatley, III | | 455/33.3 |
| 5,440,265 A | 8/1995 | Cochran et al. | | 329/300 |
| 5,448,600 A | 9/1995 | Lucas | | 375/205 |
| 5,481,570 A | 1/1996 | Winters | | 375/347 |
| 5,506,865 A | 4/1996 | Weaver, Jr. | | 375/205 |
| 5,513,176 A | 4/1996 | Dean et al. | | 370/18 |
| 5,533,011 A | 7/1996 | Dean et al. | | 370/18 |
| 5,553,098 A | 9/1996 | Cochran et al. | | 375/324 |
| 5,600,670 A | 2/1997 | Turney | | 375/208 |
| 5,602,833 A | 2/1997 | Zehavi | | 370/209 |
| 5,644,592 A | 7/1997 | Divsalar et al. | | 375/206 |
| 5,736,964 A | 4/1998 | Ghosh et al. | | 342/457 |
| 5,787,130 A | 7/1998 | Kotzin et al. | | 375/346 |
| 5,844,521 A | 12/1998 | Stephens et al. | | 342/357 |
| 5,859,613 A | 1/1999 | Otto | | 342/463 |
| 5,872,540 A | 2/1999 | Casabona et al. | | 342/362 |
| 5,872,776 A | 2/1999 | Yang | | 370/342 |
| 5,894,500 A | 4/1999 | Bruckert et al. | | 375/346 |
| 5,926,761 A | 7/1999 | Reed et al. | | 455/440 |
| 5,930,229 A | 7/1999 | Yoshida et al. | | 370/203 |
| 5,953,369 A | 9/1999 | Suzuki | | 375/206 |
| 5,978,413 A | 11/1999 | Bender | | 375/206 |
| 5,995,499 A | 11/1999 | Hottinen et al. | | 370/337 |
| 6,002,727 A | 12/1999 | Uesugi | | 375/346 |
| 6,014,373 A | 1/2000 | Schilling et al. | | 370/342 |
| 6,018,317 A | 1/2000 | Dogan et al. | | 342/378 |
| 6,032,056 A | 2/2000 | Reudink | | 455/560 |
| 6,078,611 A | 6/2000 | La Rosa et al. | | 375/206 |
| 6,088,383 A | 7/2000 | Suzuki et al. | | 375/148 |
| 6,101,385 A | 8/2000 | Monte et al. | | 455/427 |
| 6,104,712 A | 8/2000 | Robert et al. | | 370/389 |
| 6,115,409 A | 9/2000 | Upadhyay et al. | | 375/144 |
| 6,127,973 A | 10/2000 | Choi et al. | | 342/378 |
| 6,131,013 A | 10/2000 | Bergstrom et al. | | 455/63 |
| 6,137,788 A | 10/2000 | Sawahashi et al. | | 370/342 |
| 6,141,332 A | 10/2000 | Lavean | | 370/335 |
| 6,154,443 A | 11/2000 | Huang et al. | | 370/210 |
| 6,157,685 A | 12/2000 | Tanaka et al. | | 375/346 |
| 6,157,842 A | 12/2000 | Karlsson et al. | | 455/456 |
| 6,157,847 A | 12/2000 | Buehrer et al. | | 455/561 |
| 6,163,696 A | 12/2000 | Bi et al. | | 455/453 |
| 6,166,690 A | 12/2000 | Lin et al. | | 342/383 |
| 6,172,969 B1 | 1/2001 | Kawakami et al. | | 370/342 |
| 6,175,587 B1 | 1/2001 | Madhow et al. | | 375/148 |
| 6,192,067 B1 | 2/2001 | Toda et al. | | 375/144 |
| 6,201,799 B1 | 3/2001 | Huang et al. | | 370/342 |
| 6,215,812 B1 | 4/2001 | Young et al. | | 375/144 |
| 6,219,376 B1 | 4/2001 | Zhodzishsky et al. | | 375/148 |
| 6,222,828 B1 | 4/2001 | Ohlson et al. | | 370/320 |
| 6,230,180 B1 | 5/2001 | Mohamed | | 708/523 |
| 6,233,229 B1 | 5/2001 | Ranta et al. | | 370/330 |
| 6,233,459 B1 | 5/2001 | Sullivan et al. | | 455/456 |
| 6,240,124 B1 | 5/2001 | Wiedeman et al. | | 375/130 |
| 6,252,535 B1 | 6/2001 | Kober et al. | | 341/155 |
| 6,256,336 B1 | 7/2001 | Rademacher et al. | | 375/140 |
| 6,259,688 B1 | 7/2001 | Schilling et al. | | 370/342 |
| 6,263,208 B1 | 7/2001 | Chang et al. | | 455/456 |
| 6,266,529 B1 | 7/2001 | Chheda | | 455/436 |
| 6,275,186 B1 | 8/2001 | Kong | | 342/363 |
| 6,278,726 B1 | 8/2001 | Mesecher et al. | | 375/148 |
| 6,282,231 B1 | 8/2001 | Norman et al. | | 375/144 |
| 6,282,233 B1 | 8/2001 | Yoshida | | 375/148 |
| 6,285,316 B1 | 9/2001 | Nir et al. | | 342/357.09 |
| 6,285,319 B1 | 9/2001 | Rose | | 342/449 |
| 6,285,861 B1 | 9/2001 | Bonaccorso et al. | | 455/137 |
| 6,301,289 B1 | 10/2001 | Bejjani et al. | | 375/144 |
| 6,304,618 B1 | 10/2001 | Hafeez et al. | | 375/341 |
| 6,308,072 B1 | 10/2001 | Labedz et al. | | 455/448 |
| 6,310,704 B1 | 10/2001 | Dogan et al. | | 359/127 |
| 6,317,453 B1 | 11/2001 | Chang | | 375/140 |
| 6,321,090 B1 | 11/2001 | Soliman | | 455/440 |
| 6,324,159 B1 | 11/2001 | Mennekens et al. | | 370/203 |
| 6,327,471 B1 | 12/2001 | Song | | 455/440 |
| 6,330,460 B1 | 12/2001 | Wong et al. | | 455/562 |
| 6,333,947 B1 | 12/2001 | van Heeswyk et al. | | 375/148 |
| 6,339,624 B1 * | 1/2002 | Ohlson | | 375/341 |
| 6,351,235 B1 | 2/2002 | Stilp | | 342/357.06 |
| 6,351,642 B1 | 2/2002 | Corbett et al. | | 455/442 |
| 6,359,874 B1 | 3/2002 | Dent | | 370/342 |
| 6,362,760 B2 | 3/2002 | Kober et al. | | 341/141 |
| 6,377,636 B1 | 4/2002 | Paulraj et al. | | 375/346 |
| 6,380,879 B2 | 4/2002 | Kober et al. | | 341/155 |
| 6,396,804 B2 | 5/2002 | Odenwalder | | 370/209 |
| 6,404,760 B1 | 6/2002 | Holtzman et al. | | 370/342 |
| 6,430,216 B1 | 8/2002 | Kober | | 375/148 |
| 6,459,693 B1 | 10/2002 | Park et al. | | 370/342 |
| 6,501,788 B1 | 12/2002 | Wang et al. | | 375/148 |
| 6,584,115 B1 | 6/2003 | Suzuki | | 370/441 |
| 6,590,888 B1 | 7/2003 | Ohshima | | 370/342 |
| 6,661,835 B1 | 12/2003 | Sugimoto et al. | | 375/148 |
| 6,683,924 B1 | 1/2004 | Ottosson et al. | | 375/343 |
| 6,711,420 B1 * | 3/2004 | Amerga et al. | | 455/562.1 |
| 6,975,670 B1 | 12/2005 | Aldaz et al. | | 375/144 |
| 7,149,200 B1 | 12/2006 | Vadgama | | 370/335 |
| 7,194,051 B2 | 3/2007 | Li et al. | | 375/349 |
| 7,233,806 B2 * | 6/2007 | Vishwanath et al. | | 455/525 |
| 2001/0003443 A1 | 6/2001 | Velazquez et al. | | 342/367 |
| 2001/0020912 A1 | 9/2001 | Naruse et al. | | 342/357.06 |
| 2001/0021646 A1 | 9/2001 | Antonucci et al. | | 455/404 |
| 2001/0046266 A1 | 11/2001 | Rakib et al. | | 375/259 |
| 2002/0001299 A1 | 1/2002 | Petch et al. | | 370/350 |
| 2002/0051433 A1 | 5/2002 | Affes et al. | | 370/335 |
| 2002/0172173 A1 | 11/2002 | Schilling et al. | | 370/335 |
| 2002/0176488 A1 | 11/2002 | Kober | | 375/147 |
| 2003/0053526 A1 | 3/2003 | Reznik | | 375/148 |
| 2003/0054814 A1 | 3/2003 | Karabinis et al. | | 455/427 |
| 2004/0151235 A1 | 8/2004 | Olson | | 375/148 |
| 2005/0180364 A1 | 8/2005 | Nagarajan | | 370/335 |

FOREIGN PATENT DOCUMENTS

| | | |
|---|---|---|
| DE | 4326843 | 2/1995 |
| DE | 4343959 | 6/1995 |
| EP | 0558910 | 9/1993 |
| EP | 0610989 | 8/1994 |
| GB | 2280575 | 1/1995 |
| JP | 2000-13360 | 1/2000 |
| WO | WO 9211722 | 7/1992 |
| WO | WO 93/12590 | 6/1993 |
| WO | WO 9808319 | 2/1998 |
| WO | WO 0044106 | 7/2000 |
| WO | WO 03043239 | 5/2003 |
| WO | WO 03060546 | 7/2003 |

OTHER PUBLICATIONS

Price, et al., "A Communication Technique for Multipath Channels," Proceedings of the IRE, vol. 46, The Institute of Radio Engineers, New York, NY, US, 1958. 16 pages.

Schlegel, Christian, Alexander, Paul and Roy, Sumit, "Coded Asynchronous CDMA and Its Efficient Detection," IEEE Transactions on Information Theory, vol. 44, No. 7, Nov. 1998. 11 pages.

Xie, Zhenhua; Short, Robert T. and Rushforth, Craig K., "A Family of Suboptimum Detectors for Coherent Multiuser Communications," IEEE Journal on Selected Areas in Communications, vol. 8, No. 4, May 1990. 8 pages.

Viterbi, Andrew J., "Very Low Rate Convolutional Codes for Maximum Theoretical Performance of Spread-Spectrum Multiple-Access Channels," IEEE Journal on Selected Areas in Communications, vol. 8, No. 4, May 1990. 9 pages.

Verdu, Sergio, "Minimum Probability of Error for Asynchronous Gaussian Multiple-Access Channels," IEEE Transactions on Information Theory, vol. IT-32, No. 1, Jan. 1986. 12 pages.

Behrens, Richard T. and Scharf, Louis I., "Signal Processing Applications of Oblique Projection Operators," IEEE Transactions on Signal Processing, vol. 42, No. 6, Jun. 1994, pp. 1413-1424. 12 pages.

Alexander, Paul D., Rasmussen, Lars K., and Schlegel, Christian B., "A Linear Receiver for Coded Multiuser CDMA," IEEE transactions on Communications, vol. 45, No. 5, May 1997. 6 pages.

Schlegel, Christian; Roy, Sumit; Alexander, Paul D.; and Xiang, Zeng-Jun, "Multiuser Projection Receivers," IEEE Journal on Selected Areas in Communications, vol. 14, No. 8, Oct. 1996. 9 pages.

Halper, Christian; Heiss, Michael; and Brasseur, Georg, "Digital-to-Analog Conversion by Pulse-Count Modulation Methods," IEEE Transactions on Instrumentation and Measurement, vol. 45, No. 4, Aug. 1996. 10 pages.

Ortega, J.G.; Janer, C.L.; Quero, J.M.; Franquelo, L.G.; Pinilla, J.; and Serrano, J., "Analog to Digital and Digital to Analog Conversion Based on Stochastic Logic," IEEE 0-7803-3026-9/95, 1995. 5 pages.

Lin, Kun; Zhao, Kan; Chui, Edmund; Krone, Andrew; and Nohrden, Jim; "Digital Filters for High Performance Audio Delta-sigma Analog-to-Digital and Digital-to-Analog Conversions," Proceedings of ICSP '96, Crystal Semiconductor Corporation. Austin, TX, US. 5 pages.

Schlegel, C.B.; Xiang, Z-J.; and Roy, S., "Projection Receiver: A New Efficient Multi-User Detector," IEEE 0-7803-2509-5/95, 1995. 5 pages.

Affes, Sofiene; Hansen, Henrik; and Mermelstein, Paul, "Interference Subspace Rejection: A Framework for Multiuser Detection in Wideband CDMA," IEEE Journal on Selected Areas in Communications, vol. 20, No. 2, Feb. 2002. 16 pages.

Schneider, Kenneth S., "Optimum Detection of Code Division Multiplexed Signals," IEEE Transactions on Aerospace and Electronic Systems, vol. AES-15, No. 1, Jan. 1979. 5 pages.

Mitra, Urbashi, and Poor, H. Vincent, "Adaptive Receiver Algorithms for Near-Far Resistant CDMA," IEEE Transactions on Communications, vol. 43, No. 2/3/4, Feb./Mar./Apr. 1995. 12 pages.

Lupas, Ruxandra and Verdu, Sergio, "Near-Far Resistance of Multiuser Detectors in Asynchronous Channels," IEEE transactions on Communications, vol. 38, No. 4, Apr. 1990. 13 pages.

Lupas, Ruxandra and Verdu, Sergio, "Linear Multiuser Detectors for Synchronous Code-Division Multiple-Access Channels," IEEE Transactions on Information Theory, vol. 35, No. 1, Jan. 1989. 14 pages.

Cheng, Unjeng, Hurd, William J., and Statman, Joseph I., "Spread-Spectrum Code Acquisition in the Presence of Doppler Shift and Data Modulation," IEEE Transactions on Communications, vol. 38, No. 2, Feb. 1990. 10 pages.

Behrens, Richard T. and Scharf, Louis L., "Parameter Estimation in the Presence of Low Rank Noise," 22ACSSC-12/88/0341, pp. 341-344, Maple Press, 1988. 4 pages.

Iltis, Ronald A. and Mailaender, Laurence, "Multiuser Detection of Quasisynchronous CDMA Signals Using Lenear Decorrelators," IEEE Transactions on Communications, vol. 44, No. 11, Nov. 1996. 11 pages.

Mitra, Urbashi and Poor, H. Vincent, "Adaptive Decorrelating Detectors for CDMA Systems," accepted for Wireless Communications Journal, accepted May 1995. 25 pages.

Kohno, et al., Cancellation Techniques of Co-Channel Interference in Asynchronous Spread Spectrum Multiple Access Systems, May 1983, vol. J56-A. No. 5.

Garg, et al., Wireless and Personal Communications Systems, 1996, pp. 79-151, Prentice-Hall, Upper Saddle River, NJ,US.

Best, Phase-Locked Loops—Design, Simulation, and Applications, pp. 251-287, McGraw-Hill, 1999.

Rappaport, Wireless Communications—Principles & Practice, 1996, pp. 518-533, Prentice-Hall, Upper Saddle River, NJ,US.

Viterbi, CDMA—Principles of Spread Spectrum Communication, 1995, pp. 11-75 and 179-233, Addison-Wesley, Reading, MA, US.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison Wesly, Reading, MA, US.

Stimson, Introduction to Airborne Radar $2^{nd}$ edition, 1998, pp. 163-176 and 473-491, SciTech Publishing, Mendham, NJ,US.

Frankel et al., High-performance photonic analogue digital converter, Electronic Letters, Dec. 4, 1997, vol. 33, No. 25.

Thomas, Thesis for the Doctor of Philosophy Degree, UMI Dissertation Services, Jun. 1996, Ann Arbor, MI, US.

Behrens, Subspace Signal Processing in Structured Noise, UMI Dissertation Services, Jun. 1990, Ann Arbor, MI, US.

European Patent Office, Communication dated Jul. 4, 2008 in App. No. 03 770 434.3.

European Patent Office, Communication dated Jan. 13, 2009 in App. No. 03 770 434.3.

European Patent Office, Communication dated Sep. 8, 2009 in App. No. 03 770 434.3.

European Patent Office, Communication dated Jun. 27, 2006 in App. No. 02 776 047.9.

European Patent Office, Communication dated Nov. 30, 2009 in App. No. 02 776 047.9.

Scharf, Matched Subspace Detectors, Signals Systems and Computers, 1993 Conference Record of the Twenty-Seventh Asilomar Conference on Pacific Grove, CA, USA, Nov. 1-3, 1993, Los Alamitos, CA, USA, IEEE Comput. Soc., pp. 701-706.

* cited by examiner

| PATH LIST 260 | | | | | | | | |
|---|---|---|---|---|---|---|---|---|
| PATH/ FINGER 404 | ENABLE 412 | MULTIPATH SECTOR ID 414 | PILOT STRENGTH 416 | TOTAL CH STRENGTH 418 | NOISE STRENGTH 420 | SINR 422 | Rx Eb/No TRAFFIC 424 | Rx Ec/Io PILOT 426 |
| 1 | Enable | 1 | -5 dB | -5 dB | -20 dB | -6 dB | 6 dB | -9 dB |
| 2 | Enable | 1 | -15 dB | -15 dB | -22 dB | -15 dB | 4.5 dB | -11 dB |
| 3 | Enable | 2 | -9 dB | -9 dB | -19 dB | -9 dB | 5 dB | -10 dB |
| 4 | Disable | 0 | -36 dB | -36 dB | -36 dB | -36 dB | NA | NA |

Figure 4

| SECTOR PATH LIST A | |
|---|---|
| PATHS | SECTOR STRENGTH |
| 1<br>2 | -4.5 dB |

| SECTOR PATH LIST B | |
|---|---|
| PATHS | SECTOR STRENGTH |
| 3 | -9 dB |

| SECTOR PATH LIST M | |
|---|---|
| PATHS | SECTOR STRENGTH |
| Null | Null |

Return Stream Controller

RS Control Algorithm – Evaluate Valid Paths

RS Control Algorithm – Create RS Candidate List

RS Control Algorithm – Evaluate RS Selection

Scheduler for Execution Signals

Overview of Assignment Algorithm II –
One assignment per execution

Assignment Algorithm II – Find Path Candidate

Scheduler II for Execution Signals – SECTOR Centric/Time Slice

SYSTEMS AND METHODS FOR CONTROL OF ADVANCED RECEIVERS

CROSS REFERENCE TO RELATED APPLICATIONS

This application is a continuation-in-part of application Ser. No. 10/669,954, filed on 23 Sep. 2003, entitled 'Method and apparatus for selectively applying interference cancellation in spread spectrum systems' and is the non-provisional application corresponding to Application No. 60/989,449 filed on 21 Nov. 2007.

BACKGROUND

Receivers in mobile radio systems are designed to demodulate signals arriving via multiple propagation paths. The multipath environment observed at the receiver is a result of both path generating diversity schemes and mobile radio channel effects. Diversity schemes include signal transmission from different cellular base station sites (sectors) and/or multiple antennas. These transmitted signals are subject to reflection from terrestrial objects such as landscape, buildings, and cars resulting in a time varying multipath channel. Each multipath channel path is subject to a different time varying propagation delay, attenuation, and phase shift. These paths interact with each other to create constructive and destructive interference. Interference is also caused when signals from multiple sources, which are not orthogonal to one another, arrive at a receiver.

Mobile radios have a finite set of system resources with which to demodulate the received signal. The process by which these demodulation resources are assigned to receive paths is referred to as radio control or finger assignment.

Advanced receivers such as equalizers and interference cancellers offer the possibility of mitigating the interference present in the signal.

Advanced receivers are an attractive feature in such receivers since they enable interference mitigation and can provide improvements in data rates and/or capacity for the network. However, performance issues and resource constraints necessitate the development and use of methods for controlling advanced receivers, since the advanced receiver portion of the receiver also usually has a finite set of system resources with which to perform operations such as symbol estimation, equalization, and interference cancellation.

SUMMARY OF THE INVENTION

In view of the foregoing background, embodiments of the present invention may provide a receiver for signal processing for canceling intra-channel and inter-channel interference in multiple-access, spread-spectrum transmissions that propagate through frequency-selective communication channels.

In one embodiment, the receiver for signal processing, comprises a front-end processor for receiving a signal followed by a searcher coupled to the front-end processor for detecting one or more signal rays in the received signal, a selection module that selects at least one of a plurality of detected signal rays for assignment to a symbol estimator, a symbol estimator communicatively coupled to the selection module that operates on the selected signal rays to generate a plurality of symbol estimates; and an advanced receiver module communicatively coupled to the symbol estimator that operates on the plurality of symbol estimates and the received signal to generate a substantially interference cancelled signal.

In another embodiment, the receiver assigns at least one signal ray to a tracker where the information from the ray is not intended for the device for generating tracking information from the assigned ray and uses the tracking information from the tracker in a symbol estimator for the purpose of equalization or cancellation.

In another embodiment, the receiver may use metrics from the received signal rays to decide what technique of advanced receiver to use for the particular scenario.

BRIEF DESCRIPTION OF THE DRAWINGS

FIG. 4 illustrates the contents of a Path List.

DETAILED DESCRIPTION OF PREFERRED EMBODIMENTS

Figure 1:
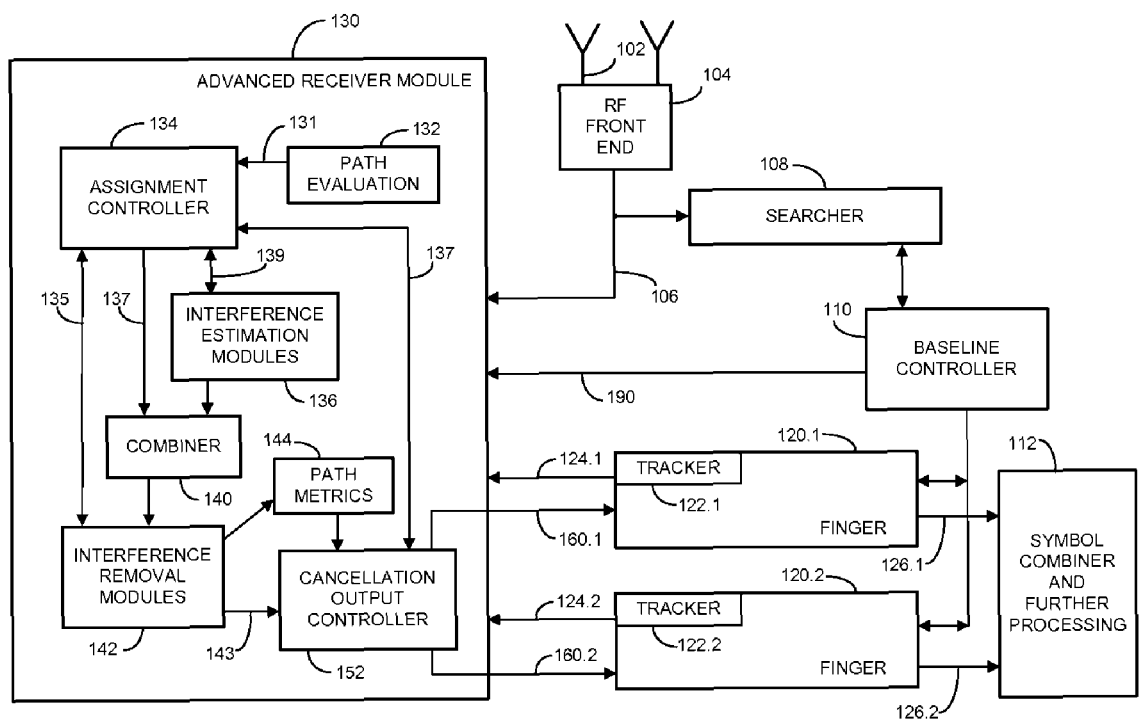
FIG. 1 is a block diagram depicting components of a spread spectrum receiver in accordance with an embodiment of the present invention.

In FIG. 1, the present invention is shown, embedded in a spread spectrum communication receiver. The receiver downconverts to base band signals received over the air via the antenna 102 and front end processor 104. One or more antennas may be used, even though two are shown in the figure. The oversampled, raw signal stream(s) 106 is provided to a searcher 108 which identifies signal rays from one or more signal sources. The searcher 108 reports the signal paths that have been identified to the baseline controller 110. The baseline controller 110 then assigns paths to fingers 120 for tracking the signal. Tracking is well known in the art, and refers to the estimation of precise timing information of received rays, and the code sequences corresponding to the rays. In Rake based systems, the fingers may perform additional functions such as demodulation. Each demodulated finger is provided to a symbol combiner 112 which combines and processes the paths.

In accordance with an embodiment of the present invention, an advanced receiver module 130 is incorporated in the spread spectrum communication receiver. In general, the advanced receiver module provides for the selective application and use of an advanced receiver technique such as equalization or interference cancellation. The raw signal stream 106 is input to the advanced receiver module 130 along with tracking information 124 for each path assigned to a finger 120. The paths are evaluated 132 and processed (134, 136, 140 and 142) in an attempt to remove the interference of one or more paths from all the other paths. Multiple signal cancellation modules 142 may exist, providing multiple interference cancellation signal streams for each path. An optional return stream controller 152 identifies, for each path, which cancellation stream (if any) is appropriate to return to a given finger 124. The individually returned streams 160 allow the advanced receiver module 130 to selectively provide interference cancelled signals to each finger 120. In this manner, all paths may receive the appropriate signal stream that provides the best performance.

The advanced receiver module 130 may introduce a processing delay in time with respect to the raw signal stream 106. This processing delay may be an integer number of chips or an integer number of symbols (N). A processing delay module, not shown in FIG. 1, which may be a buffer or a delay line is incorporated to delay the raw signal stream in time by the processing delay incurred in the advanced receiver module. Some processing delay may be inherent in the module because of the batch processing nature of some of the operations within the advanced receiver. The delayed raw signal stream is fed to the return stream controller 152 allowing it to seamlessly switch between one or more signal streams from the advanced receiver and the raw signal stream without perturbing a given finger's tracking mechanism. This delay may be adjusted for in the baseline controller 110 where the PN offset assigned to a finger is advanced by the processing delay. This adjustment may also be made by masking the codes appropriately. More information on how this masking may be performed is disclosed in co-pending U.S. patent application Ser. No. 11/253,045, the entire contents of which are hereby incorporated by disclosure. Tracking information 124 provided by each finger may provide the compensated or non-compensated tracking information to the advanced receiver module 130.

Each finger 120 may provide tracking information 124 to the advanced receiver module 130. This information may include the PN sequence at the offset assigned to the finger, the symbol boundary strobe (SBS) for identifying the beginning of a symbol, the chip enable flag (CEF) for identifying the on-time chip sample in the oversampled I/Q stream for each arriving ray. Also, signals such as Assigned (indicating when a finger is tracking a ray assigned to it), Locked (indicating when a finger is locked onto its assigned path), and/or Advance/Retard (indicating when the tracker has advanced or retarded some number of samples) may be provided to 130. The baseline controller 110 may also provide finger tracking information 190 to the advanced receiver module 130, which may be used in the interference estimation module(s).

The fingers 120 may be configured in different ways depending on the specific implementation. Implementations include embodiments where the advanced receiver module and the baseband modem are separate modules, as well as those where the advanced receiver module and the baseband modem are tightly integrated. Fingers refers both to fingers that are physically present, and those that are time multiplexed modules with finger functionality operating at a rate faster than the time needed for processing a single finger.

In an alternative embodiment, the estimation of the interference is performed on a single stream of IQ data per sector that is a result of equalization rather than Rake combining. In such an embodiment, modules track the different rays for their timing information which is then fed to modules that perform channel estimation. An equalizer takes as input the received signal stream and the channel estimates, amongst other inputs and produces an equalized stream of data.

Tracking information may be available for signal rays that are routinely assigned to fingers for demodulation, and also for rays that are assigned to fingers that are assigned for the purposes of deriving timing and code information for symbol estimation, which may be then be used for interference estimation, even when timing and code information from that finger/path is not being used in the receiver to recover information bits. In some implementations, tracking information may be made available from fingers that are implemented within the advanced receiver module solely for the purpose of generating tracking and code sequence information to be used for interference cancellation. The use of information from fingers that are not being used for demodulation occurs in scenarios where information intended for the receiver is being transmitted only from one sector, such as in the HSDPA and EV-DO standards. These scenarios can also arise in blocking conditions, which may occur due to missed messaging between the mobile and the base station, in the event of missing neighbors in the neighbor set, or when a base station sector is incapable of handoff or handover since it is at capacity. Other scenarios include the use of closed access systems such as Home Node-B systems or Femto-base stations, where a terminal finds itself near a base station that it may not be served by.

According to one embodiment of the present invention an enable/disable control signal is provided to the advanced receiver module 130 which allows a receiver controller to selectively choose when the module 130 will be active. When the advanced receiver module 130 is active, additional streams of data are produced for one or more rays received at the receiver, and equalization or interference cancellation may be selectively applied. If the advanced receiver module 130 is disabled, the raw signal stream 106 is fed to each finger 160. Additional power savings may be obtained by disabling clocks that are exclusively used in the advanced receiver circuitry. The advanced receiver may also be turned off in conditions such as sleep mode, or if the receiver determines that the base station is transmitting at its lowest allowable transmit power and there can be no benefits of using an advanced receiver.

Figure 2:
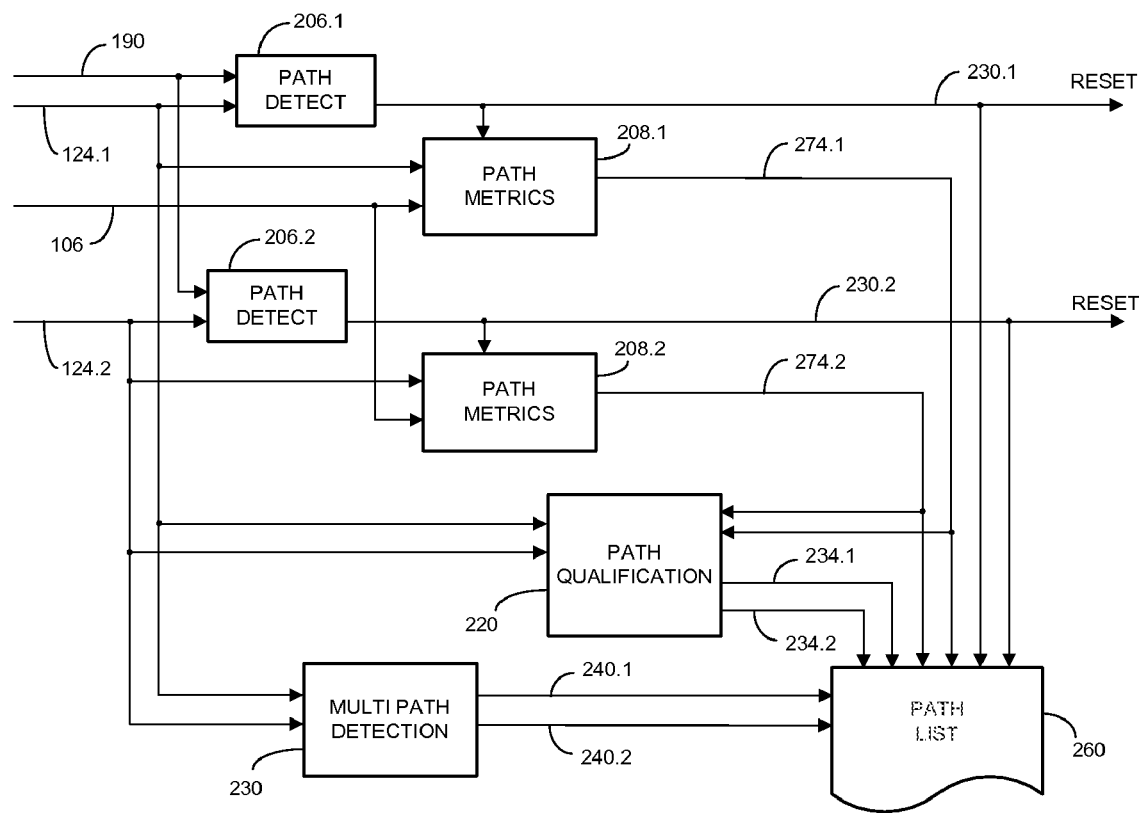
FIG. 2 is a block diagram depicting the components of the Path Evaluation Module.

In FIG. 2, components within the path evaluation module 132 (FIG. 1) are illustrated. The functionality of this module may also be implemented using normal searcher and finger assignment functions that are present in a receiver.

This module is mainly designed for advanced receiver implementations where the necessary information need for the advanced receiver, which is usually present in the baseline receiver, is all not automatically available in the advanced receiver. Information from each ray may be recorded and updated in a Path List 260. A path detection module 206 determines if a finger has been assigned to track a path. A reset indicator may be generated to establish if a path is present. If so, a path metrics module 208 provides information about the path.

A multipath detection module 230 identifies if the paths present are multipaths of each other. The resultant information is recorded in the path list 260 as a multipath ID. Also, a path qualification module 220 determines if the path is suitable for interference cancellation, either as an interfering path, or as a path that will benefit from having interference removed from it. The path qualification module may use the signal strength of the path or some other figure of merit derived from the signal strength to qualify the path. In the preferred embodiment, this module 220 also detects the presence of side-lobe paths (signal paths erroneously assigned to delay offsets corresponding to side-lobe peaks in the correlation function of the transmit-receive pulse). Improving the signal to noise ratio of a side-lobe path does not help the performance of the receiver.

Side-lobe paths are detected by finding paths that are located at a fixed offset from another dominant path. In a preferred embodiment, based on a particular transmit and receive filter, and a type of RF front end and filter, the separation is about 1.44 chips. This chip separation between a main path and a side-lobe path may change for different matched transmitter and receiver designs, and one may determine analytically, or from simple experimentation, the location of these side-lobe paths. These paths are partnered with each other, and their pilot strengths compared. If the pilot strength of one or more of the partners is less than a certain fraction of the strength of the strongest partner, they are considered side-lobe paths. The path enable signal 234 is disabled for side-lobe paths. If paths are not determined to be side-lobe paths, then their path enable signals 234 are enabled.

The path qualification module 220 can be used for other receiver considerations. For example, a particular path (or finger) can be disabled intermittently or permanently within the cancellation module. This provides configuration flexibility within the baseline controller when assigning paths to fingers.

In another embodiment of the invention, the Path List 260 (FIG. 2) is filled in directly by the Baseline Controller 110 (FIG. 1), where the information may already be available and which may be signaled directly. This eliminates the need for the sub modules in the path evaluation module 132 (FIG. 1).

FIG. 3 illustrates the different figures of merit that may be computed for a given path. These include the strength of a pilot, the noise in the channel, and the loading on the sector or path, as computed by the total strength of all the received traffic channels.

Figure 3A:
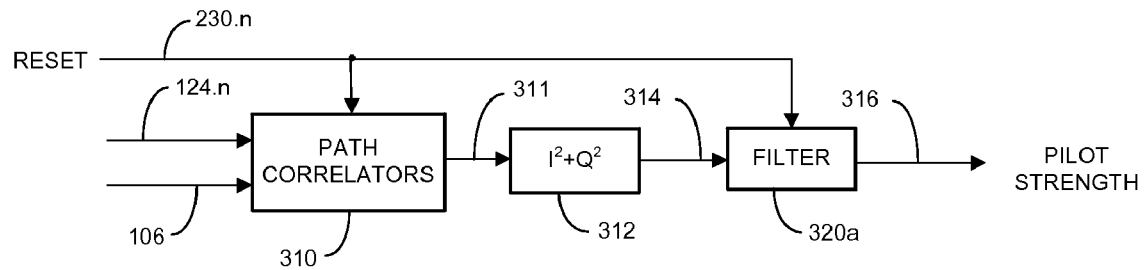
FIG. 3 is a block diagram depicting the different figures of merit that may be computed in the Path Metrics Module.

FIG. 3a illustrates an embodiment of the path metrics module 208.n (from FIG. 2) where n denotes the $n^{th}$ finger or path. The raw signal stream(s) 106 is input to 208.n along with path tracking information 124.n for the $n^{th}$ path. A correlator module 310 uses the path information to obtain PN stripped (despread), I and Q symbol values from the raw signal stream. The I and Q values are passed to the strength computing module 312 where a figure of merit such as the pilot strength is identified and filtered in the filter module 320. Alternative figures of merits such as SNR of the ray or sector may be computed and filtered as well. The output of the filter 320 is the average pilot strength of the path. The reset 230.n indicator may be used to clear the filter when a path is not present. It may also be set to a value based on prior information about the sector or ray, such as from a searcher. The preferred embodiment of the filter 320 is a low pass filter implemented using a single pole, Infinite Impulse Response (IIR) design, although any filter design may be used to retain the low frequency content of the pilot strength. In some embodiments, more refined estimates of the strength that include the signal to noise ratio may be used.

Figure 3B:
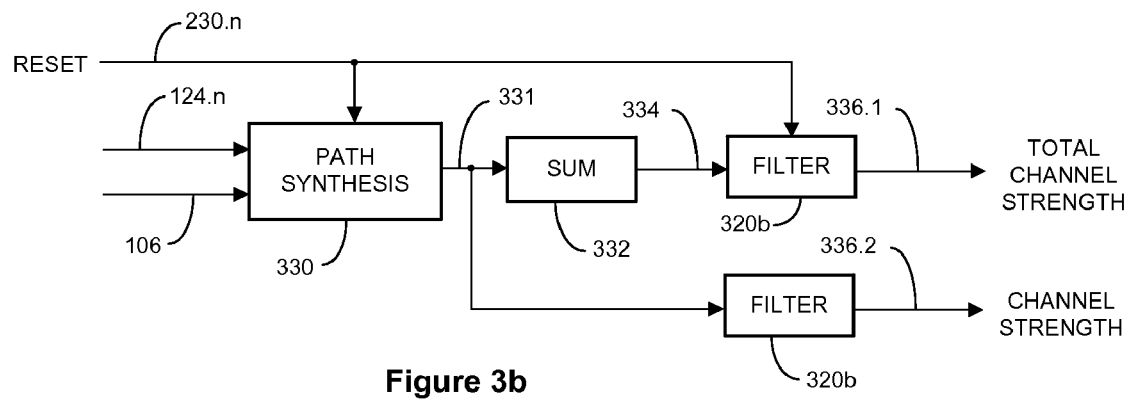

FIG. 3b is an embodiment of this invention that computes the average loading from a sector, and in some embodiments, also may compute a metric relating to the variance of the traffic channel loading, such as the variance of the received traffic channel powers. Alternative statistics derived from the received traffic channel powers may also be used.

Figure 3C:
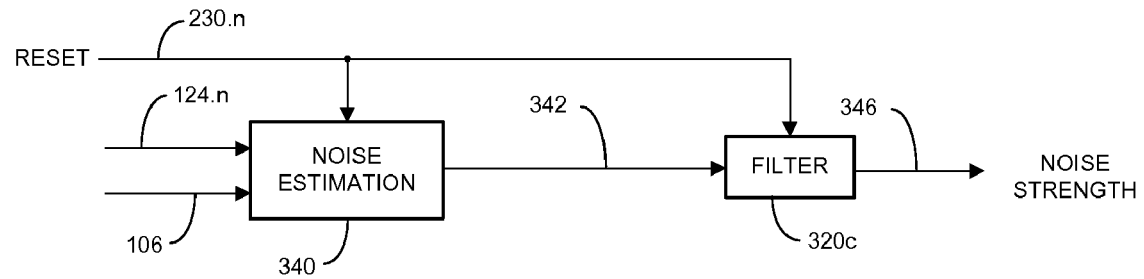

FIG. 3c illustrates the estimator of noise for each sector, which may be used either inside the advanced receiver, or for computing the SNR of the sector for the purpose of computing a metric associated with each sector.

In one embodiment of this invention, the advanced receiver is implemented as a configurable module, which uses the metrics generated from the signal, such as traffic channel loading, the variance and mean of weights generated from symbol estimates, geometry of the sector whose symbol estimates are being estimated, noise levels, fading speeds, and Doppler to determine what the best mode of operation would be for the advanced receiver, and the controller configures the advanced receiver module appropriately. For example, for high geometry conditions with light loading, projective cancellation may be used, whereas subtractive cancellation may be used for other conditions. Similar decisions may be made between equalization and interference cancellation. For example, high geometry scenarios may respond well to equalization of the paths belonging to the sector, whereas lower geometry scenarios may respond better to interference cancellation. Different advanced receiver techniques could be pre-characterized through simulation for their relative performance across different types of scenarios, and the results may then be used to generate the set of rules for switching between the different receiver techniques.

In FIG. 4, the contents of a path list are illustrated. Each finger connected to the advanced receiver module is identified 404. An enable status 412 indicates if the finger is actively tracking a path, has locked onto the path and if the path is useful or valid for the cancellation module (from the path qualification module). The path's pilot strength 416 and its lock status may be part of the path list. These values may be represented as linear or logarithm values. Multipath information 414 is identified for each enabled path. Paths with the same multipath index are those that are determined or known to be multipaths of each other.

Other path attributes may be recorded in the Path List 260 such as assignment to a canceller and the return stream selection. These attributes are described later.

Figures 5A, 5B:
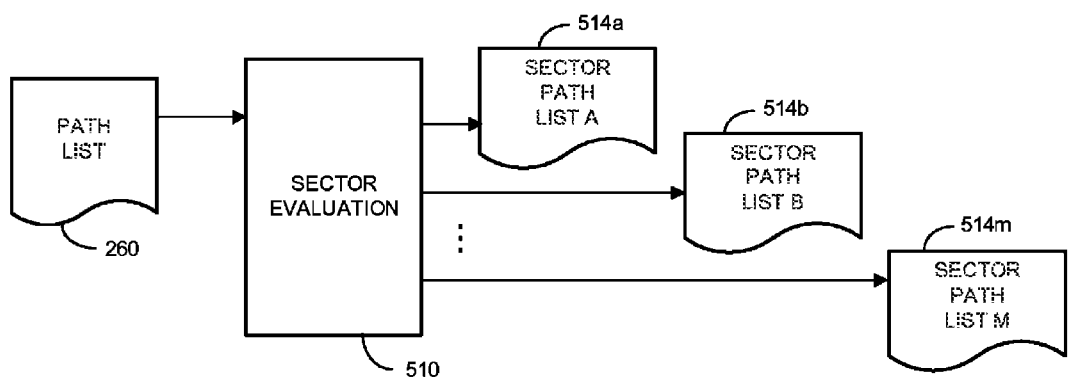
FIG. 5 illustrates the contents of a Sector Path List.

FIGS. 5a and 5b illustrate the generation of sector path lists, and an example of the contents of a sector path list. The list contains an enumeration of the signal sources (sectors, base-stations or Node-Bs) and a figure of merit associated with each source, such as the strength, or total power received from the base station. This figure of merit is used as a basis for decision making in the assignment of sources and paths to advanced receiver resources.

Figure 6:
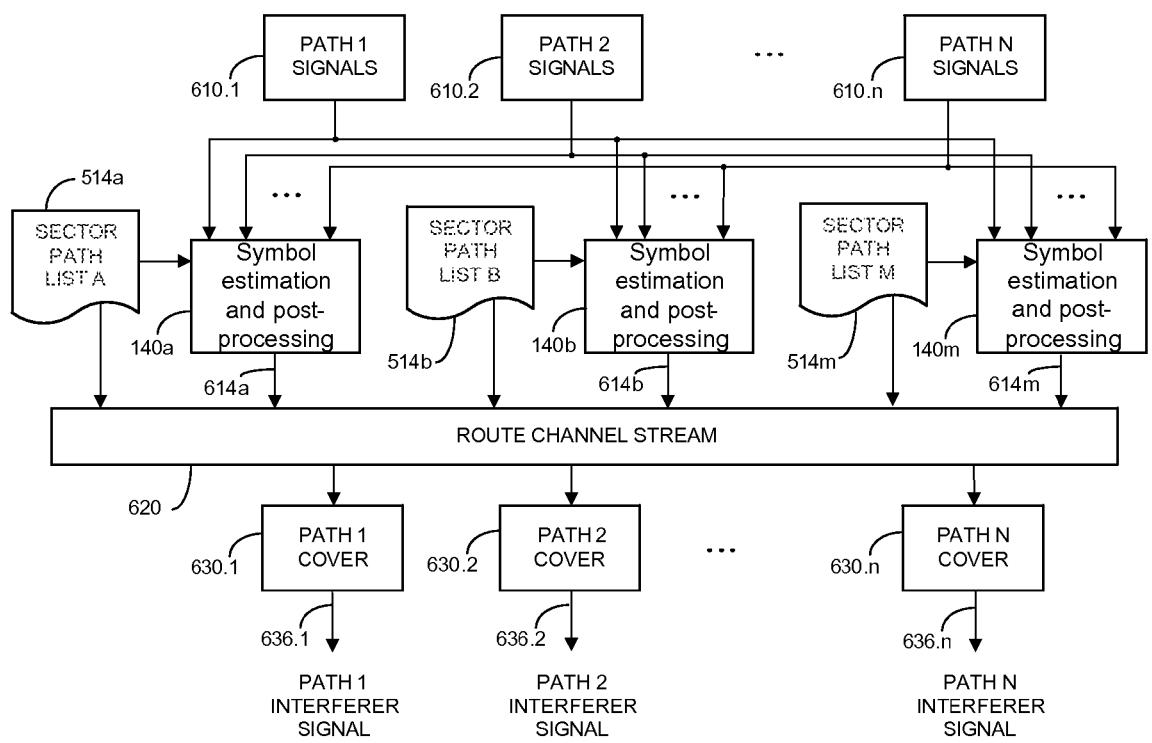
FIG. 6 is a block diagram depicting components and signal flow of an embodiment of this invention.

FIG. 6 illustrates the signal flow in accordance with an embodiment of this invention. Using the figure of merit of the source, the best number of sources that match the number of symbol estimators in the system are selected. A symbol estimator operates on the rays from each sector and performs post-processing, at the end of which, an estimated transmitted signal is produced. Information from each of the rays used in the estimation may be used in order to create a replica of the received signal from that ray. After this interference removal can occur. Interference removal or cancellation may be implemented using any of various advanced receiver techniques that are known in the art, including (but not limited to) equalization, subtractive interference cancellation or projection based interference cancellation.

In order for the symbol estimation and post-processing module to produce a representation of the interference from the assigned path, path tracking information is used to despread the PN sequence of the path from the raw signal stream. The complex channel gain, also referred to as the phase of the path, may also be removed. The rays may then be combined using MRC combining or using equalization. Symbol estimation may be performed on the combined, despread and derotated data to yield symbol estimates. After an estimate of the interference from the sector or path is produced, it is covered by the path's PN sequence. The respective path's phase (channel estimate) may also be applied if it was removed in the path strip module. The resultant signal is the interference estimate for the sector or path to be removed in the signal cancellation module.

Figure 7:
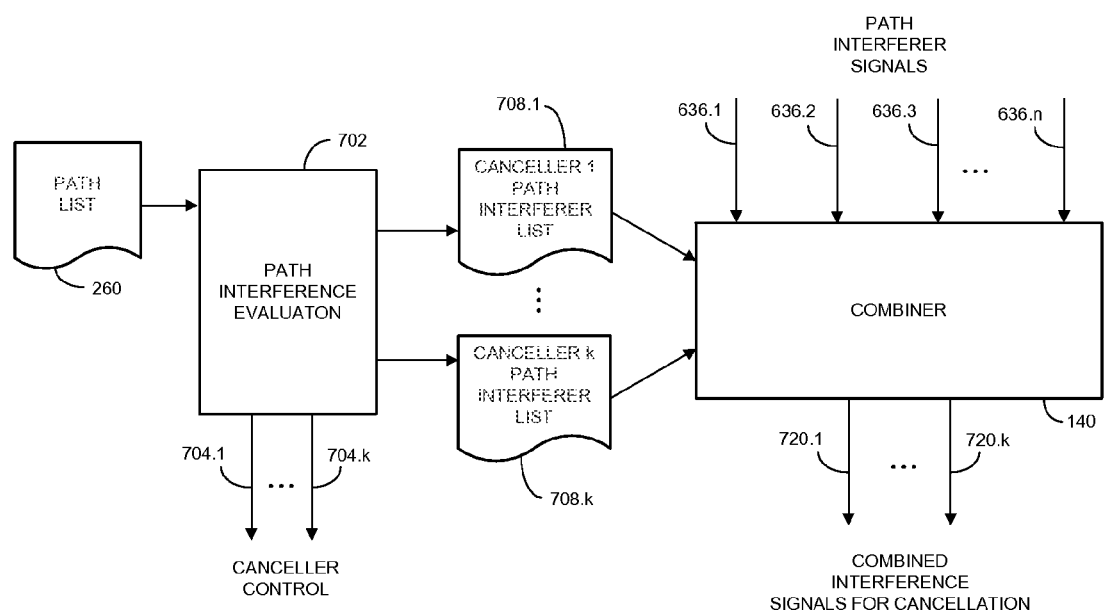
FIG. 7 depicts the construction of interference vectors in accordance with an embodiment of this invention.

FIG. 7 illustrates the manner in which individual path interference estimates 636.1 through 636.n are used to create interference estimates for each ray being used in demodulation. The interference estimate of the ray of interest in excluded, and the rest are combined to create interference estimates 720.1 through 720.k.

In another embodiment, the summation of all available interference estimates are subtracted from the original signal, including the signal(s) of interest, and then the interference estimate of the signal of interest is added back.

Figure 8:
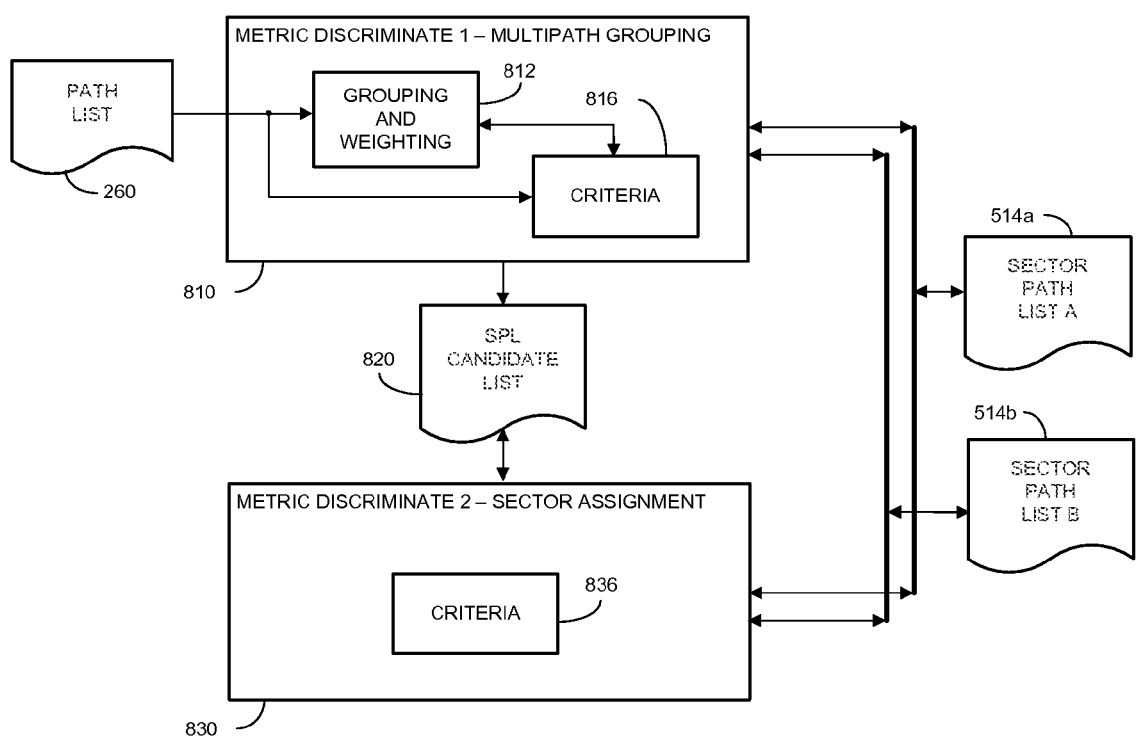
FIG. 8 illustrates the creation of the Sector Path List.

FIG. 8 shows the multipath grouping and the sector assignment, and the creation of the sector path lists. Information from the path list 260 is used first to sort path information into the respective groups or sectors.

Figure 9:
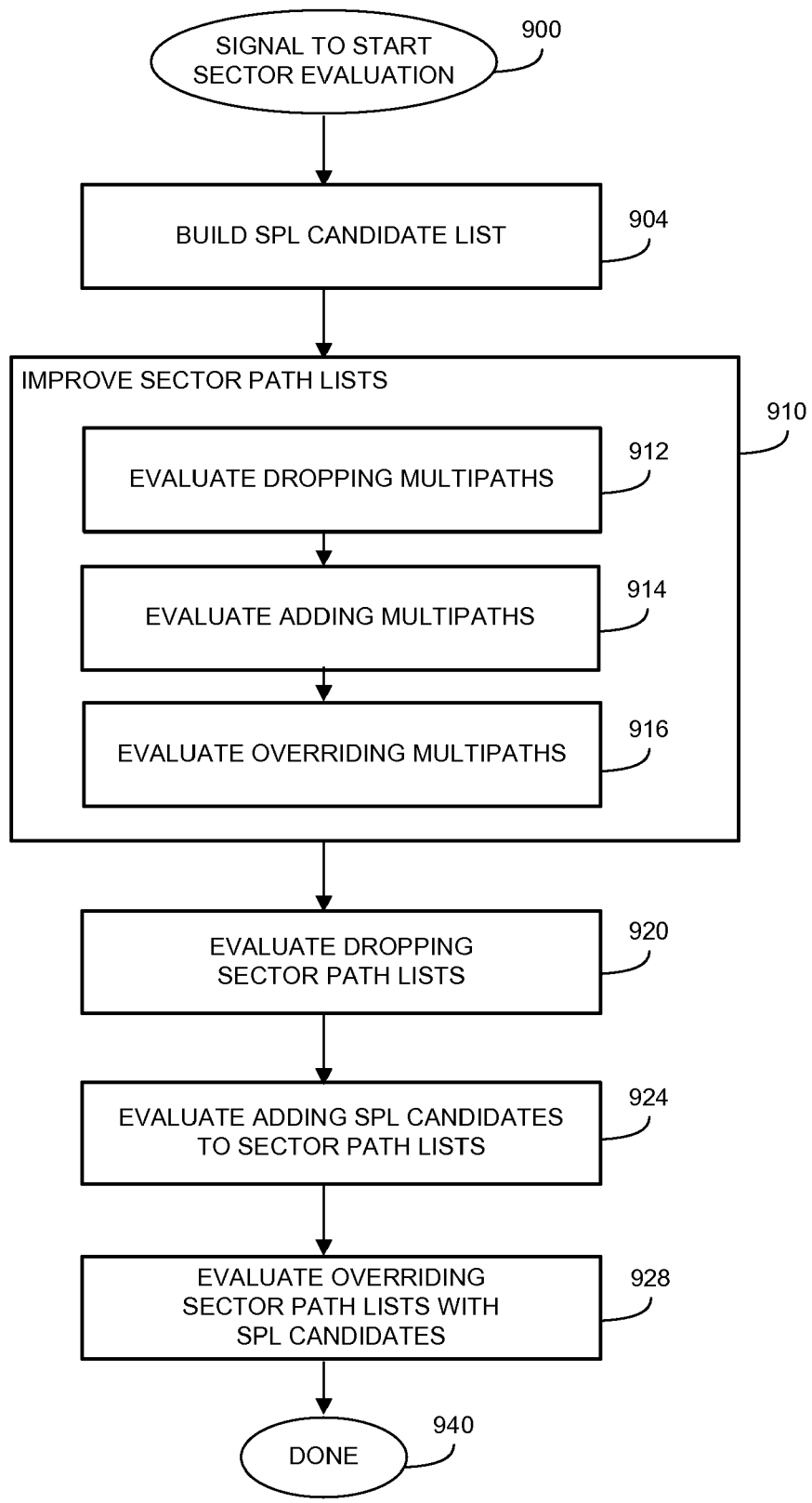
FIG. 9 is an overview of the assignment algorithm, as it relates to the Sector Path List.

FIG. 9 shows an overview of the assignment algorithm for the path or sector assignment module 510 (FIG. 5). A signal is received 900 from the cancellation module 130 (FIG. 1) to evaluate the assignment of paths to cancellers. When the signal is received, the assignment algorithm creates 904 a sector path candidate list. After that, improvements to an assigned sector are considered based on new multipath information that may be available. Next, sectors that are already assigned to cancellers are evaluated to determine if they should be dropped (i.e., unassigned) in 920. In 924, sector path list candidates are added to unassigned cancellers and in 928, cancellers that were previously assigned are evaluated to determine if candidate paths can override (or be reassigned) to these cancellers. The algorithm completes its cycle 940 and waits for another signal from the cancellation module 130 to re-evaluate assignments.

Figure 10:
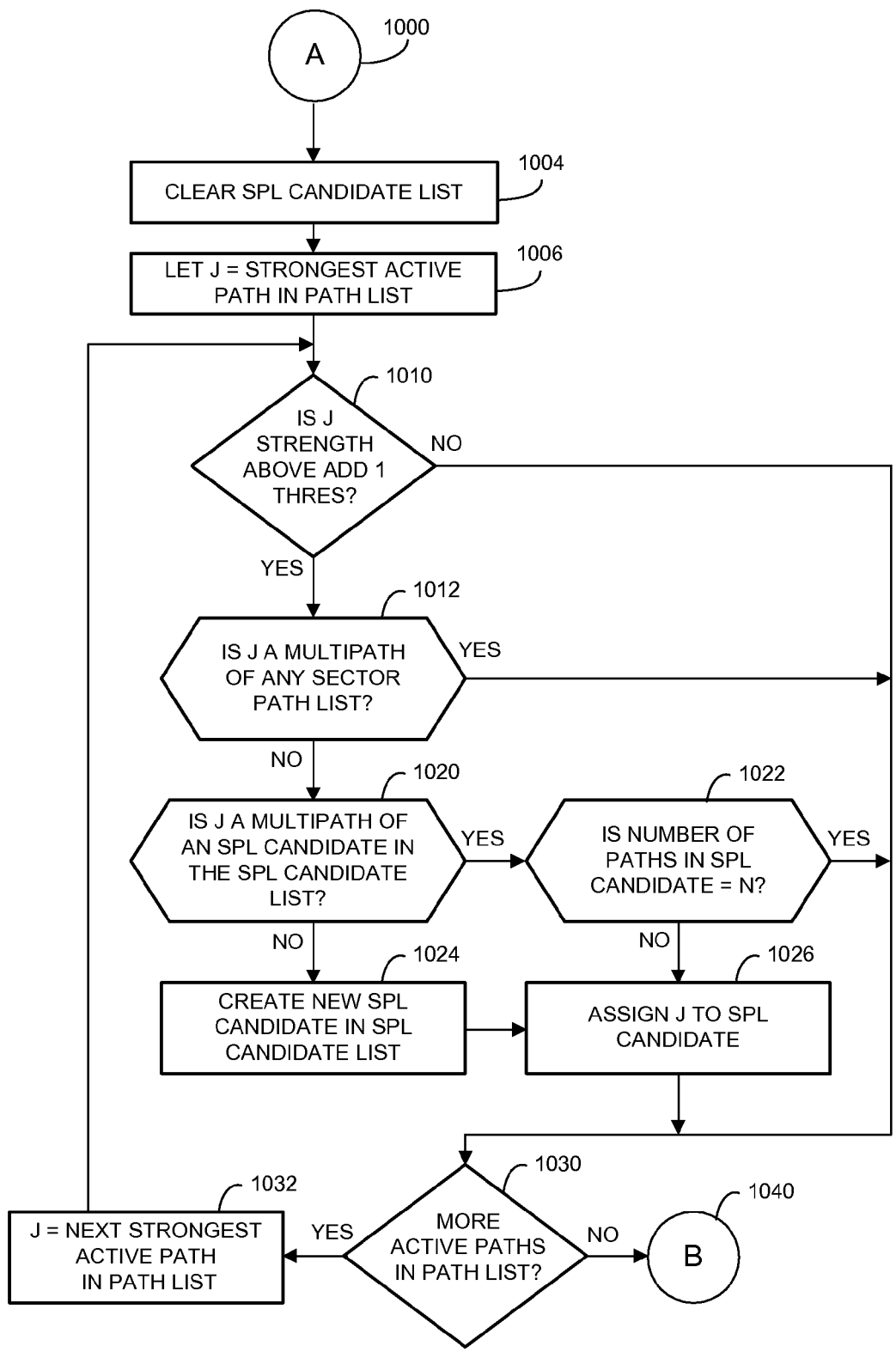
FIG. 10 illustrates an embodiment for creating the sector path candidate list.

FIG. 10 illustrates an embodiment for creating the sector path candidate list. The process starts 1000 with a signal from the assignment algorithm and clears the sector path candidate list 1004. The Path List 260 (FIG. 2) is used to determine active (or enabled) paths in the system. A variable J is used to step through the active paths in the path list: steps 1006, 1020 and 1030.

For each active path J, the path will be assigned to the path candidate list 1114 if it is not already assigned to a canceller 1012, and its average pilot strength defined in the path list is greater than an 'add' threshold 1010. Step 1010 helps ensure that only strong paths are considered as interferers.

When all active paths have been evaluated for the path candidate list 1120, the sector path candidate list is complete and the algorithm moves to the next stage (B) 1040.

Figure 11:
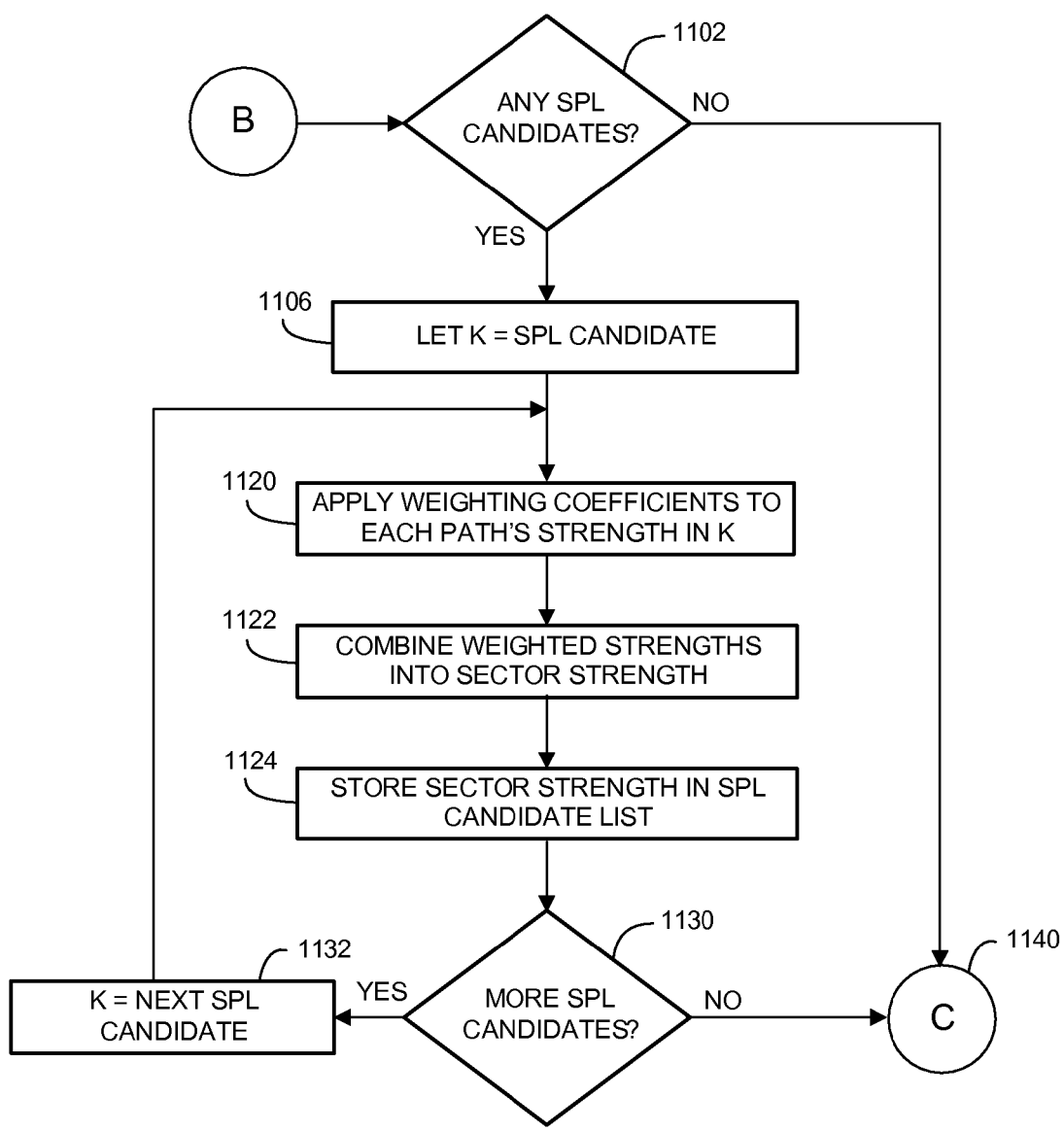
FIG. 11 is a flowchart illustrating a process for generating sector strengths for individual paths.

In FIG. 11, the sector (or Node-B or base station) strength is evaluated by weighing and combining the strengths of the individual rays that comprise that sector's path list. Weights are applied to the strength of each path 1120, and then combined 1122 to create a sector strength that is stored 1124 in the sector candidate list. This process is repeated until the sector strength of each sector in the SPL candidate list is computed and stored.

Figure 12:
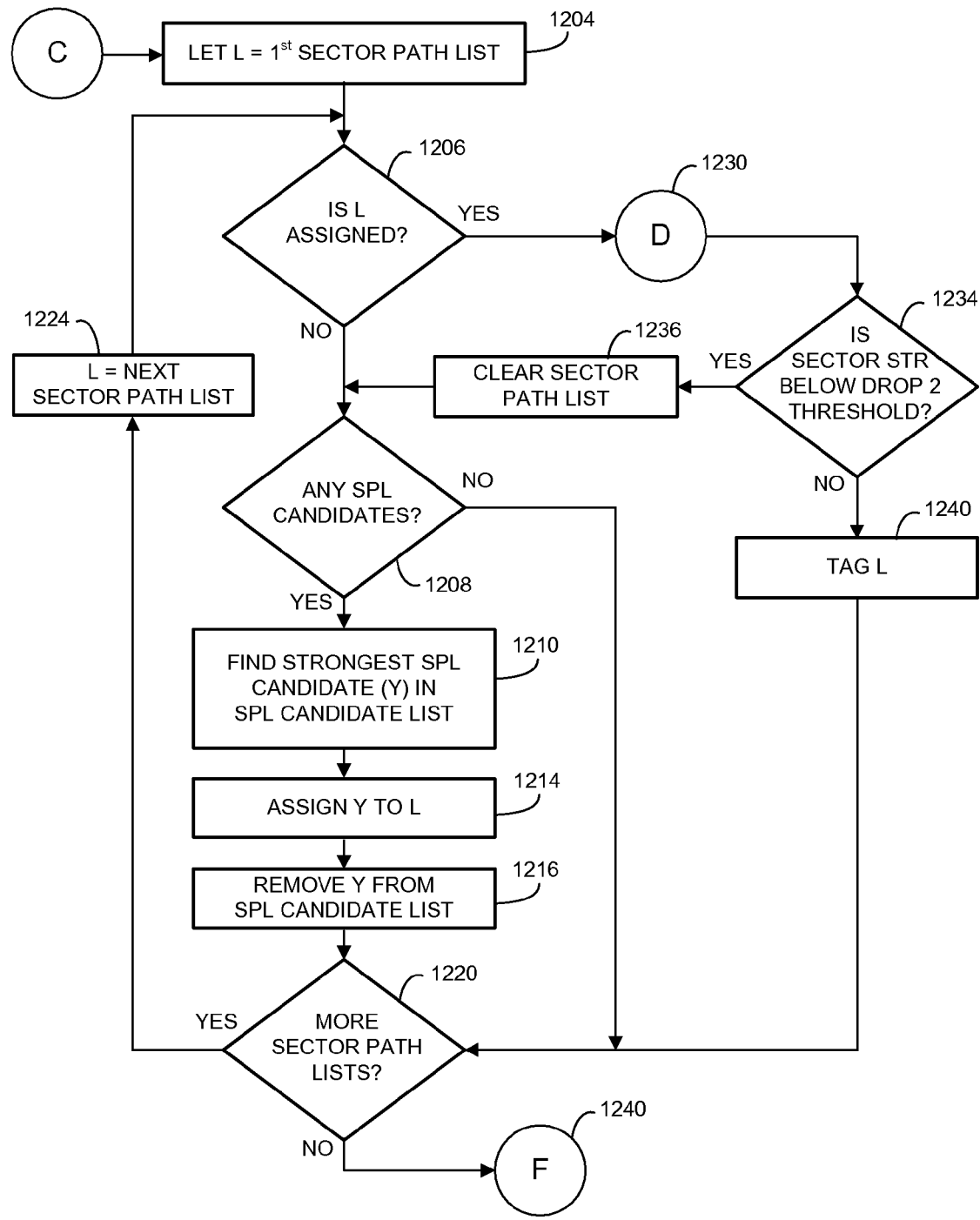
FIG. 12 is a flowchart illustrating a process for maintaining the Sector candidate path list.

In FIG. 12, stage C 1140 starts by evaluating the first advanced receiver in the sector path list 1204. If it is already assigned a sector 1206, then the sectors average pilot strength, or an alternative figure of merit (from the path list) is compared to a 'drop' threshold 1234. If the figure of merit falls below the 'drop' threshold, the path is unassigned in 1236. If the average pilot strength is above the 'drop' threshold, then canceller L is tagged 1240 for further processing.

If an advanced receiver estimation module has become unassigned 1236 or was not assigned initially 1206, then the algorithm tries to find a sector from the sector path candidate list (steps 1208 to 1216) to assign to the estimation module. At step 1208, if there are no sector path candidates in the list, then the algorithm evaluates the next advanced receiver module 1220. If sector path candidates are present, then the strongest sector path candidate is found in the list (Y=strongest sector path candidate in list) 1210. Y is assigned to module L 1214. Then, path Y is removed from the sector path candidate list 1216. When all advanced receiver modules have been evaluated (1220 and 1224), the algorithm moves to stage F 1240.

Figure 13:
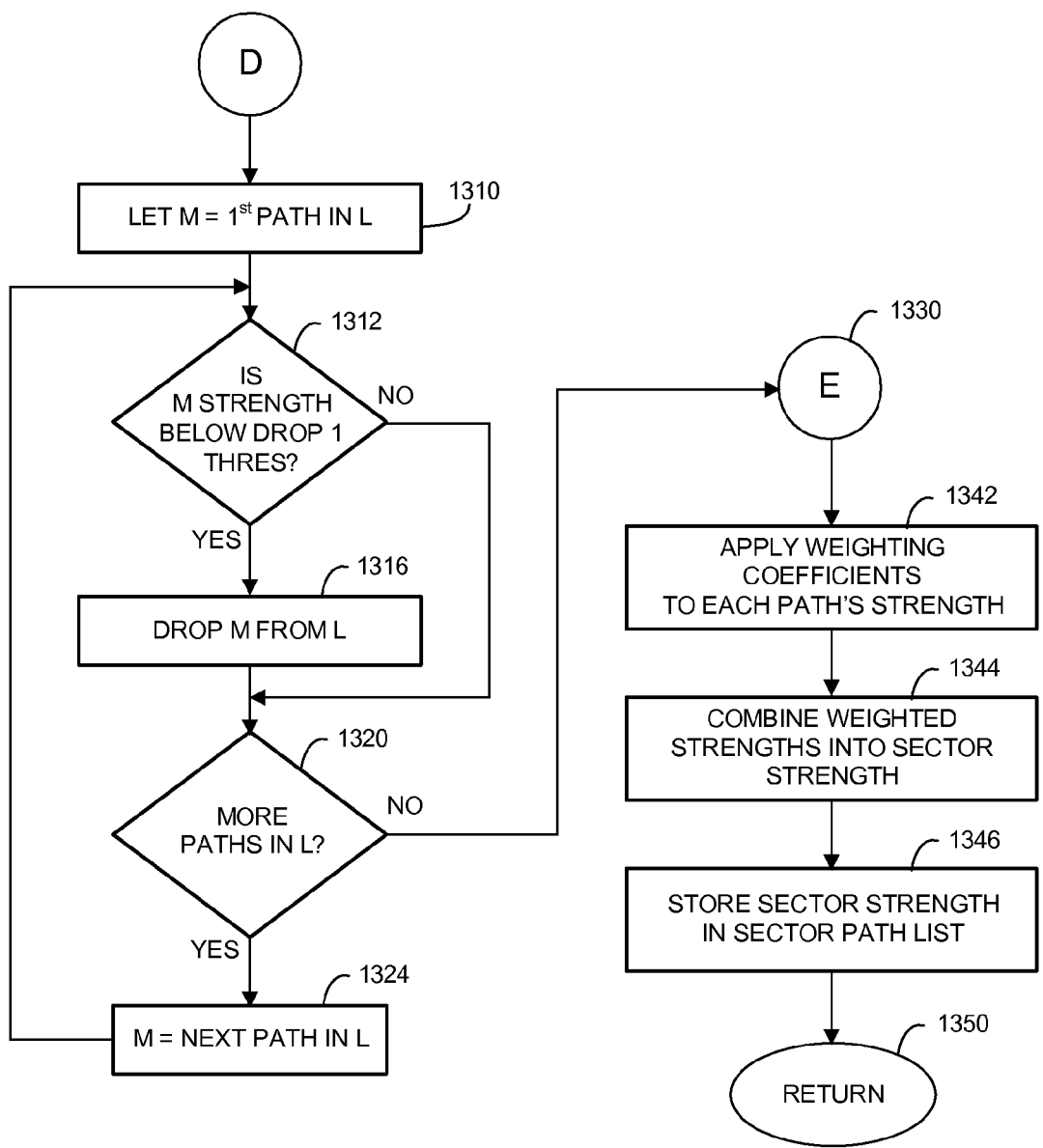
FIG. 13 is a flowchart illustrating another embodiment for maintaining the Sector candidate path list.

FIG. 13 illustrates the process by which a sector path list is maintained. Within a given sector L, the individual rays are evaluated 1312 to see if they are below the add threshold specified, and if so, are dropped 1316 from the list. This process is repeated for all paths until all paths within a sector that are below a drop threshold (DROP 1 threshold) are dropped. Weighing coefficients are then applied 1342 to all remaining paths, and then combined 1344 and then the strength (or an alternate figure of merit derived from the strength) is stored 1346.

Figure 14:
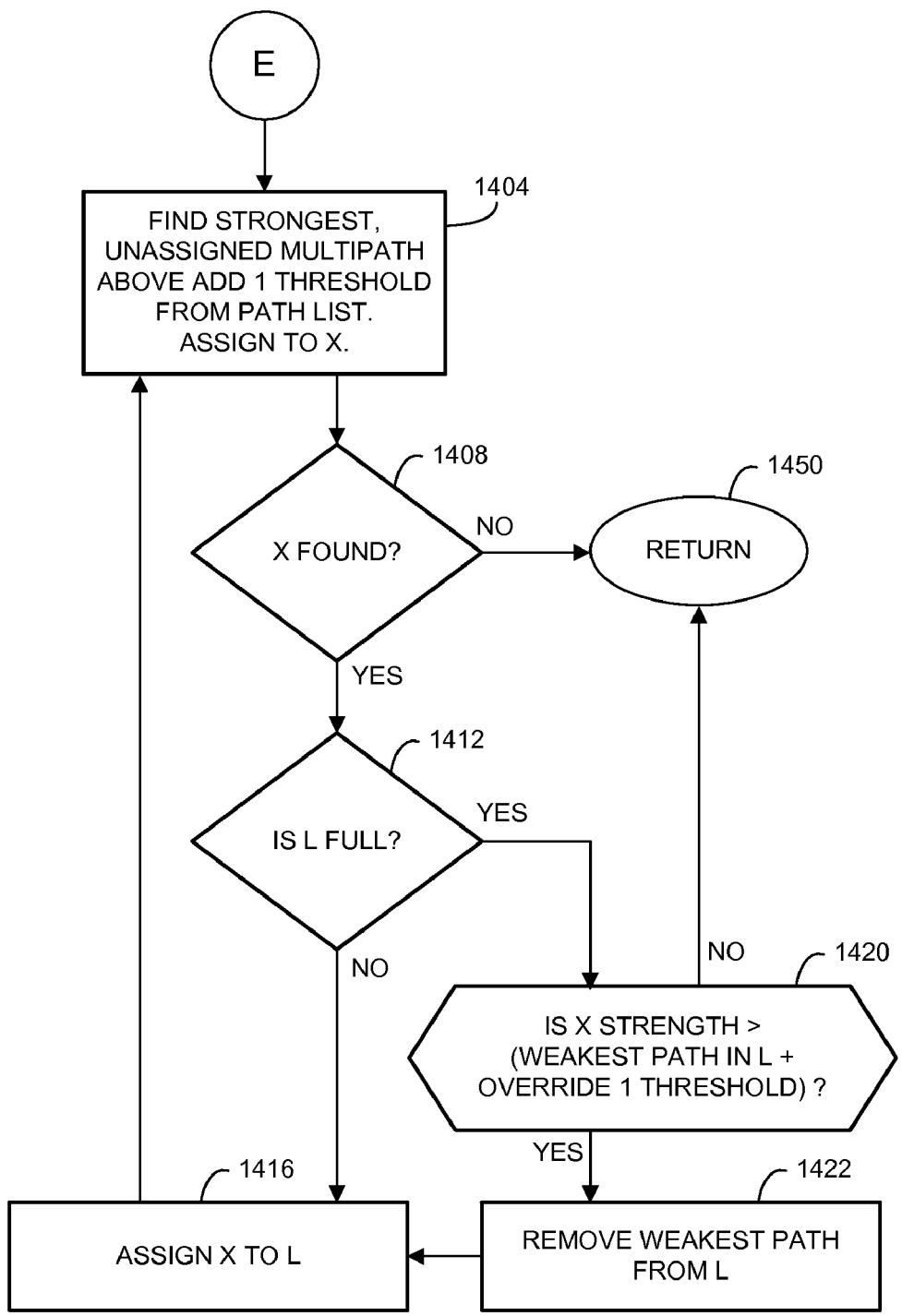
FIG. 14 illustrates the process by which paths or rays for a given sector are assigned to a sector path list where the sector path list has a limit on the number of elements.

FIG. 14 illustrates the process by which paths or rays for a given sector are assigned to a sector path list where the sector path list has a limit on the number of elements. This would be an option for advanced receivers that have a front-end combiner of rays from a sector that have a cost associated with handling additional rays. Maximal Ratio combining (MRC) combiners for front-end combining would be one such example. Equalizers may not have such a cost associated with the combining, but may still have a cost associated with maintaining modules for recovering the timing of these rays.

In this process, the strongest unassigned multipath that is above an ADD1 threshold is evaluated, and if the sector path list count (L) is not at its maximum 1412, the ray is assigned to the list, and the process continues with the evaluation of the next strongest ray from that sector. If the sector path list is full due to previous assignments, then the multipath being evaluated is compared 1420 against the weakest path currently in the list. If the strength of the unassigned multipath exceeds that of the weakest path by a certain override threshold (may be zero as well), then the weaker multipath is removed, and the multipath being evaluated is added to the list.

Figure 15:
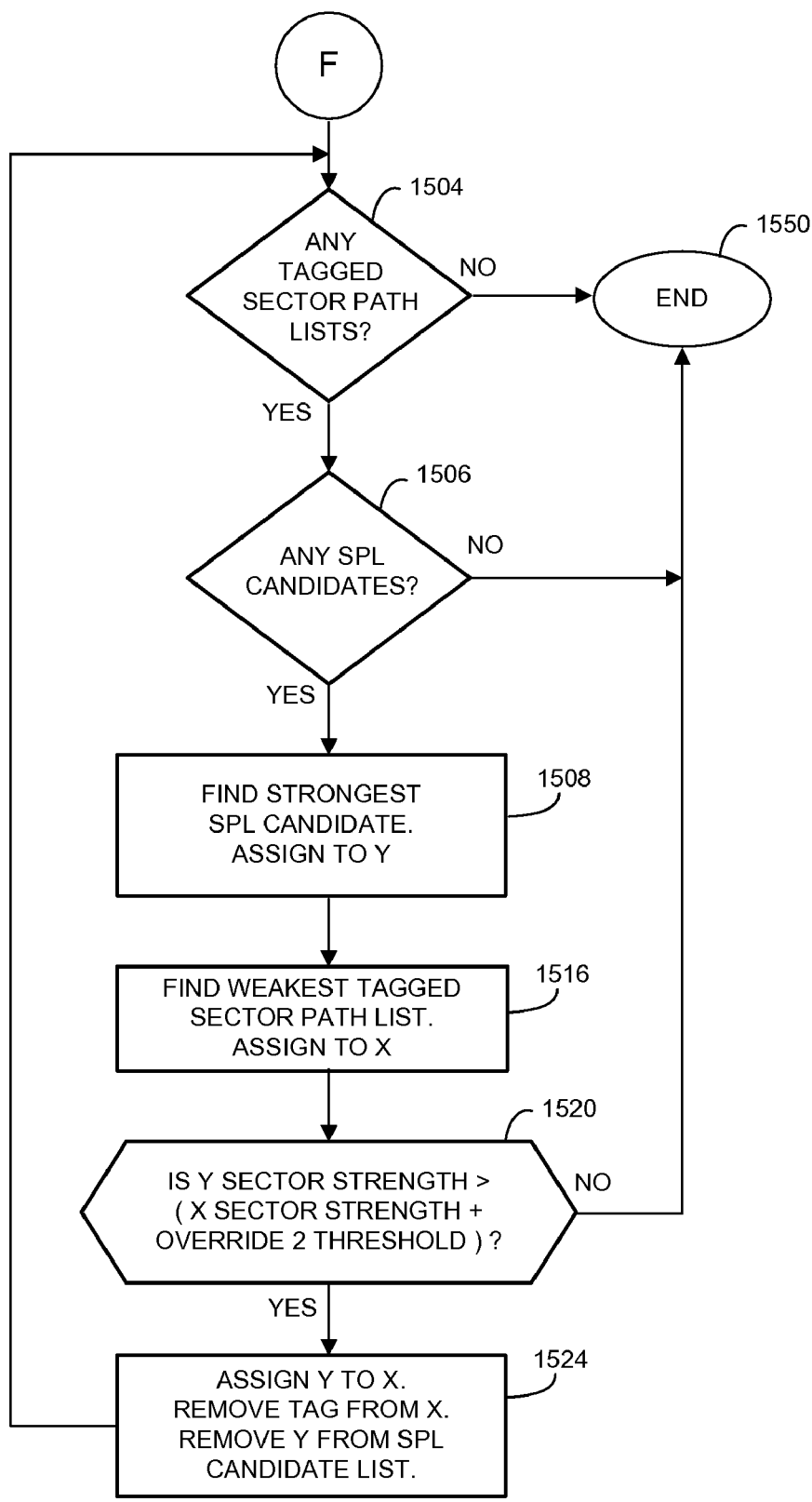
FIG. 15 illustrates the process by which sector path candidates are added to the sector path list.

FIG. 15 illustrates the process by which sector path candidates are added to the sector path list subject to certain conditions being met. The strongest sector path list candidate is compared 1520 to the weakest sector in the sector path list identified in 1516, and if the candidate strength exceeds the weakest sector by an override threshold, the new sector replaces the weakest existing sector in the list. In another preferred embodiment, for the contents to be changed, the override threshold condition must be met in addition to a time threshold where the excess strength condition must be true for a pre-determined time. This is done to prevent excessive switching of sectors being selected for symbol estimation which can cause a reassignment of symbol estimators. Reassignment of symbol estimators may come with a cost in performance due to the time taken for the symbol estimators and the post-processors to reach steady-state values in their filters, etc.

Figure 16:
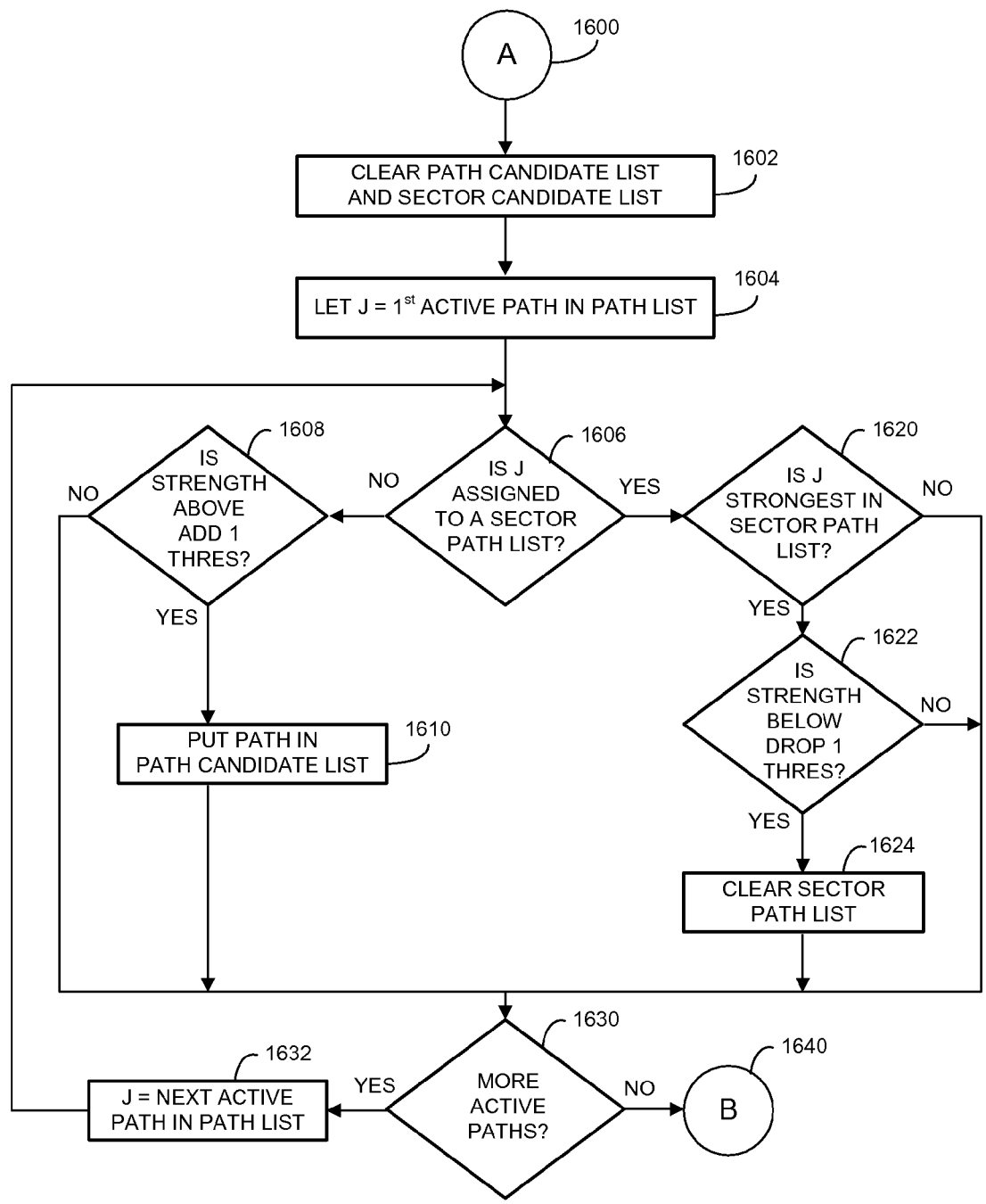
FIG. 16 is a flowchart illustrating a process for evaluating valid paths within the Return Stream Control algorithm.

FIG. 16 illustrates the process by which the path and sector candidate lists are maintained. At the beginning of the cycle 1600, the lists are cleared, and the process begins by examining the first active path in the path list 1604, which may be a list of assigned fingers, assigned and locked fingers or a list of rays for which timing information is available. This path is then checked to see if it is currently used in an advanced receiver process 1606. If is not currently assigned, its strength or figure of merit is checked 1608 against the ADD 1 threshold, and if it exceeds it, it is added to the path candidate list 1610, and the process checks for the next active path. If it does not exceed the threshold, the process moves straight to examining the next active path. If the path is assigned to a sector path list in 1606, the ray is checked to see if it is the strongest path in the list 1620, and if it is, it is checked to see if the path is below the Drop 1 threshold in 1622. If the strongest ray of a sector path list is below the threshold, the sector path list is cleared for that sector, and the next path is evaluated.

Figure 17:
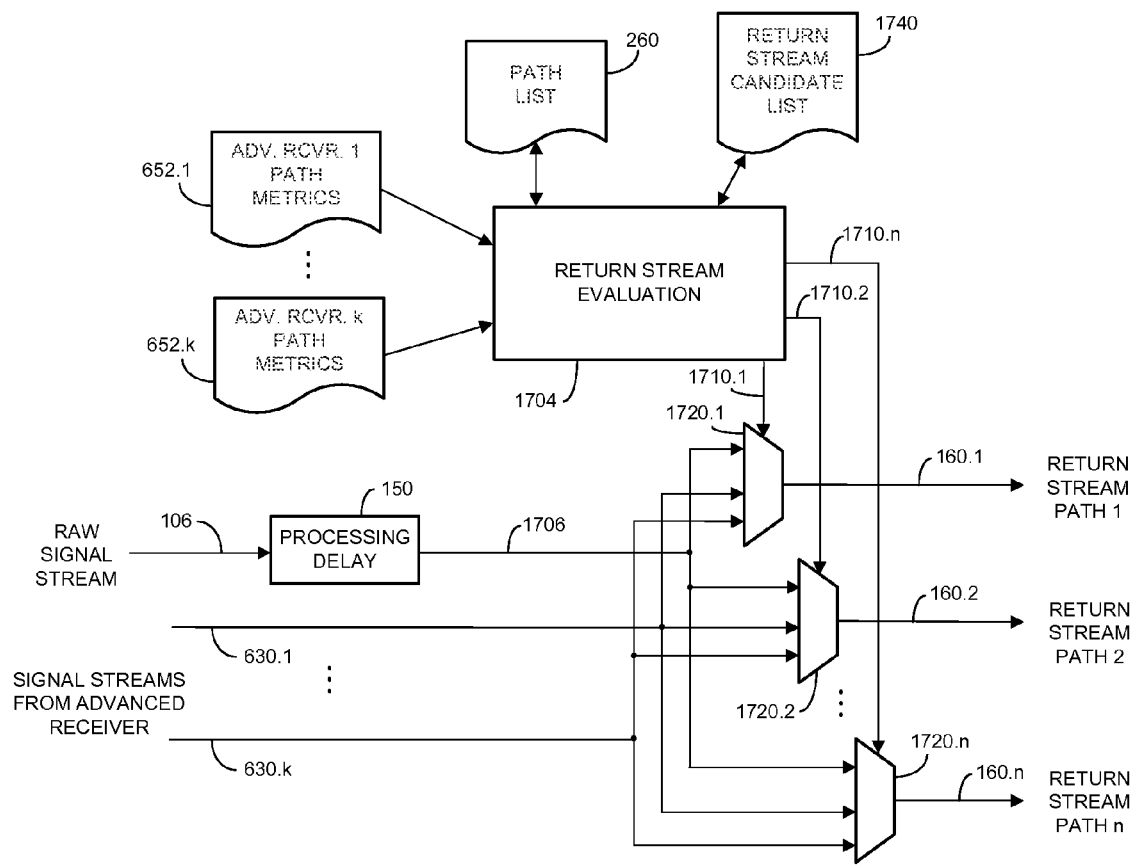
FIG. 17 illustrates the components of the return stream controller.

In FIG. 17, components of the return stream controller 152 (FIG. 1) are shown. A return stream evaluation module 1704 determines which signal stream to return for each finger tracking a path. A multiplexer for each path 1720 allows the return stream evaluation module 1704 to select 1710 a return stream 160 from one of the advanced receiver produced streams, (630.1 to 630.$k$) or a delayed version 1706 of the raw signal stream 106. The selection algorithm (illustrated in FIGS. 15 to 19) is based on the canceller path metrics lists 652, the path list 260 and an intermediate return stream candidate list 1740.

Figure 18:
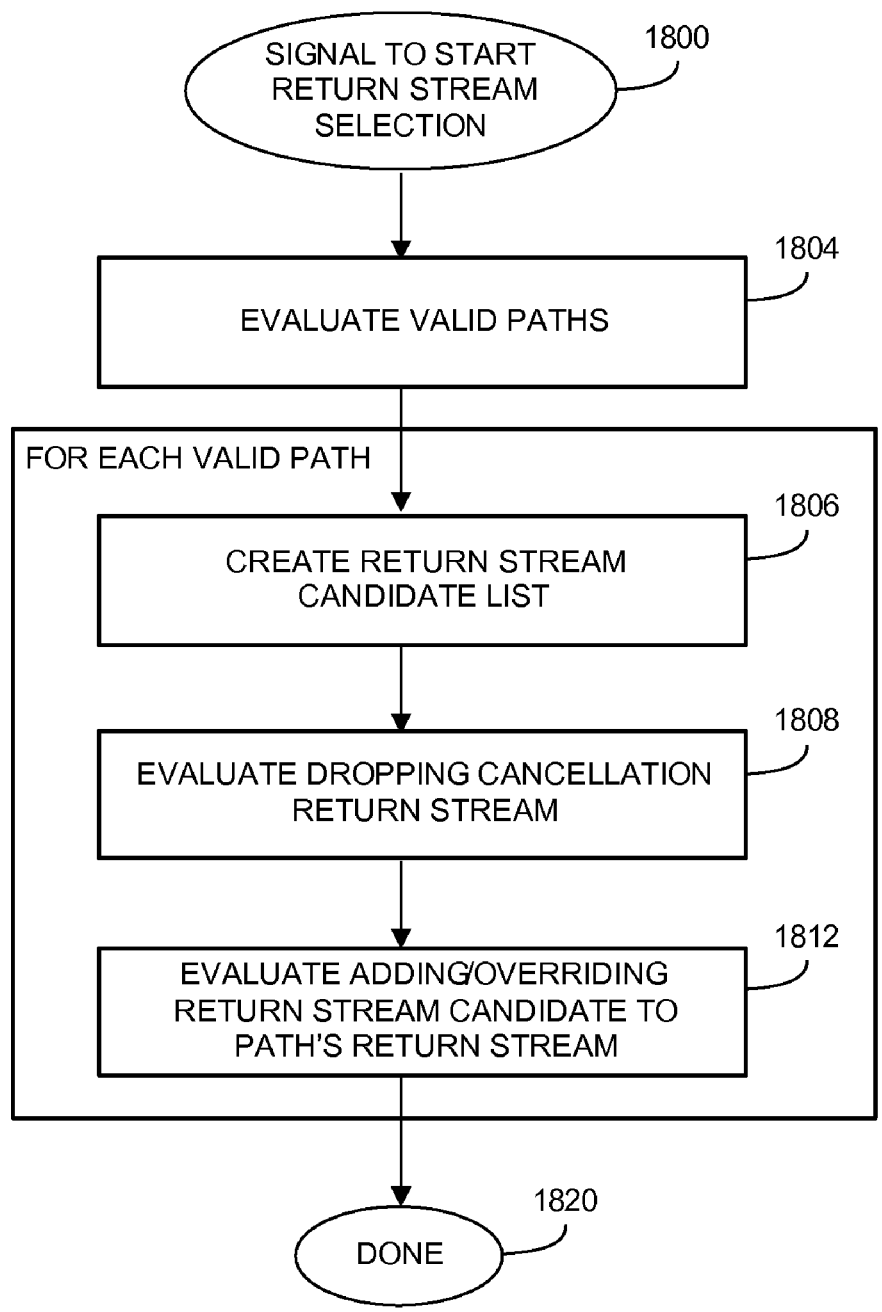
FIG. 18 shows an overview of the Return Stream Selection (RSS) algorithm for the return stream controller module.

FIG. 18 shows an overview of the Return Stream Selection (RSS) algorithm for the return stream controller module 904 (FIG. 9). A signal is received 1800 from the advanced module 130 (FIG. 1) to evaluate the RSS for paths. When the signal is received the RSS algorithm evaluates valid paths 1804. Then, for each valid path, a return stream candidate list is created 1806 from the canceller path metric lists 652 (FIG. 6). Paths with interference cancellation signal streams selected are evaluated to see if the stream should be dropped 1808. Finally, new streams are evaluated for adding or overriding existing selections 1812.

Figure 19:
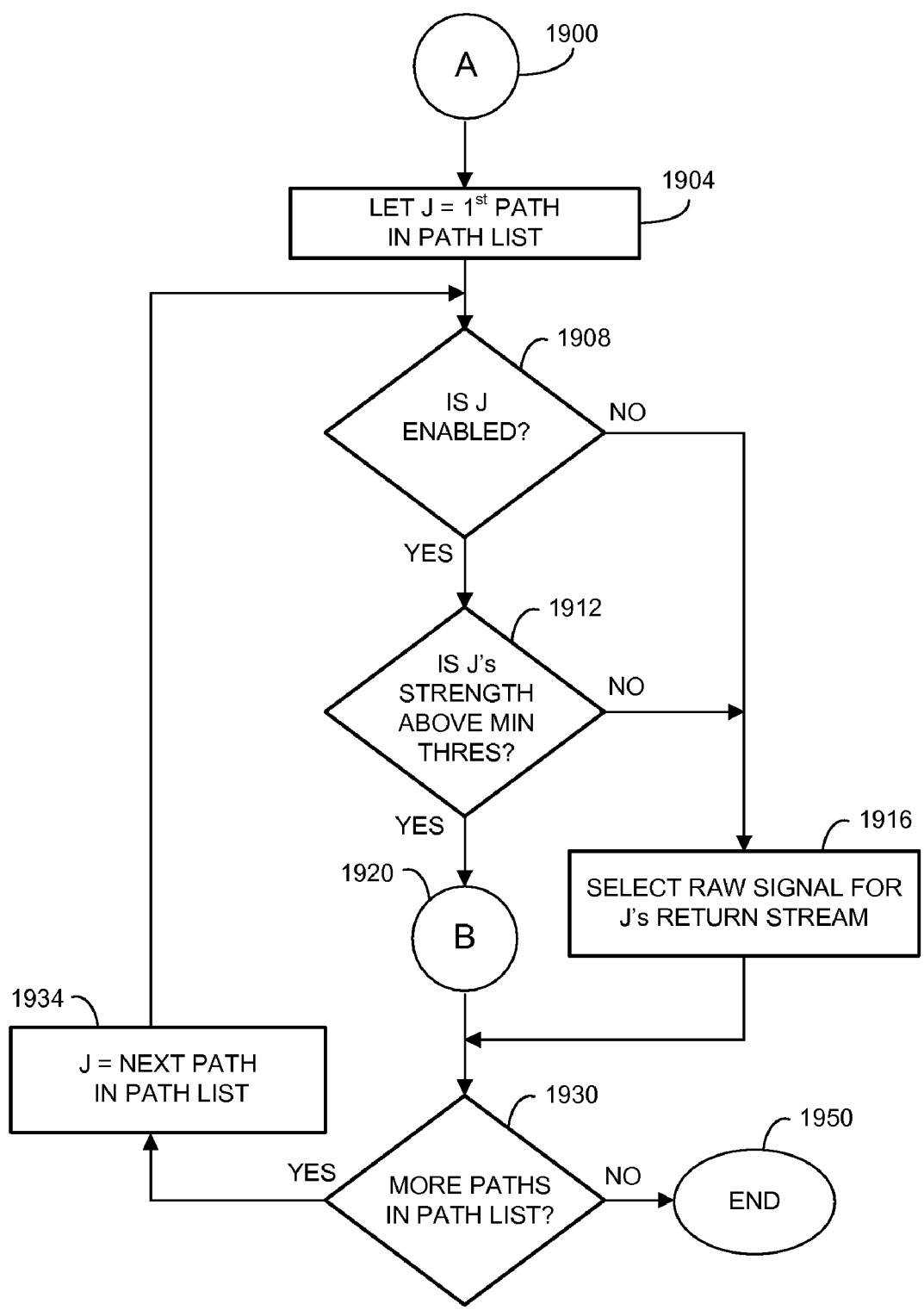
FIG. 19 illustrates an embodiment of the RSS algorithm for evaluating valid paths.
Figure 20:
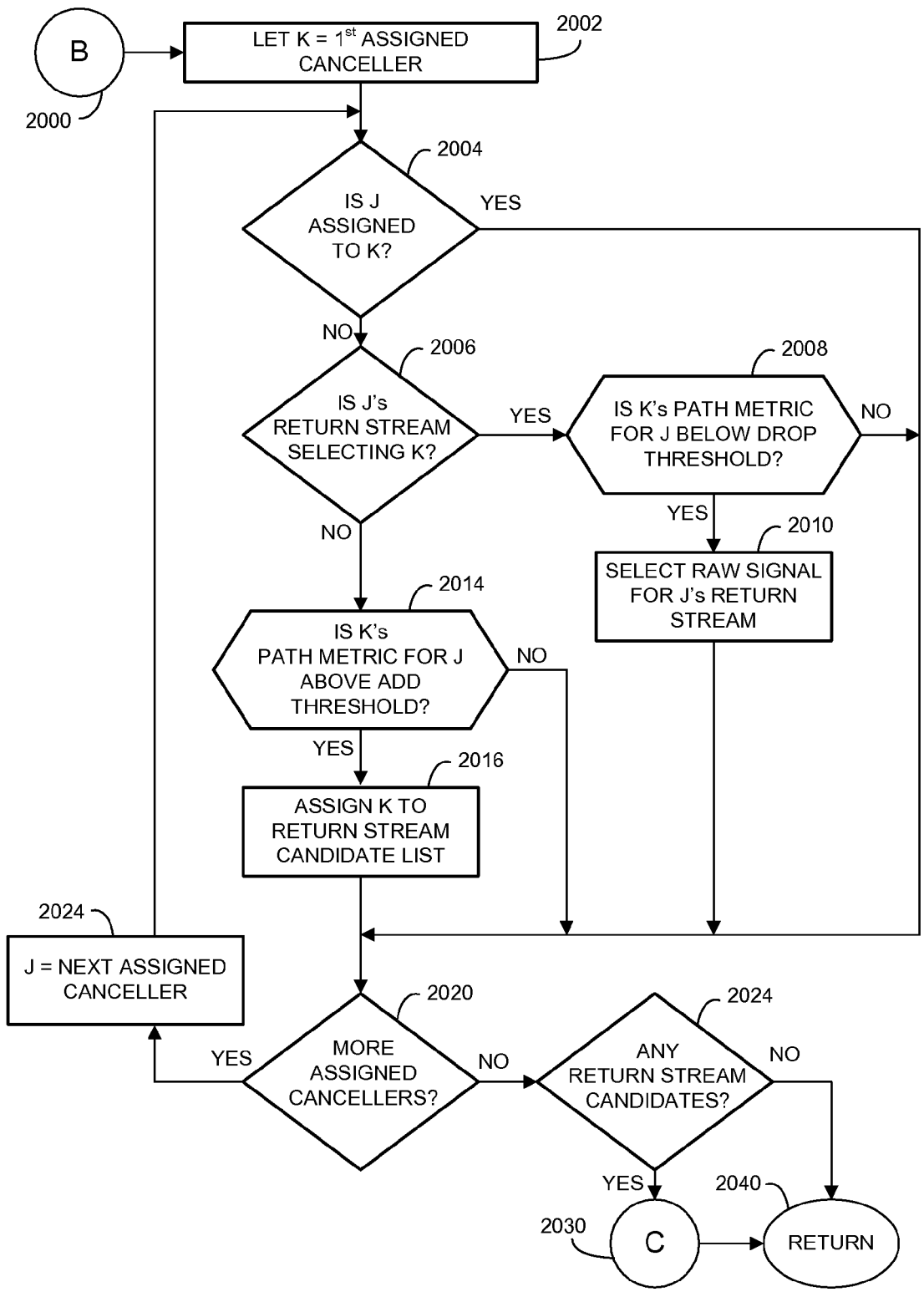
FIG. 20 illustrates another stage of the RSS algorithm.
Figure 21:
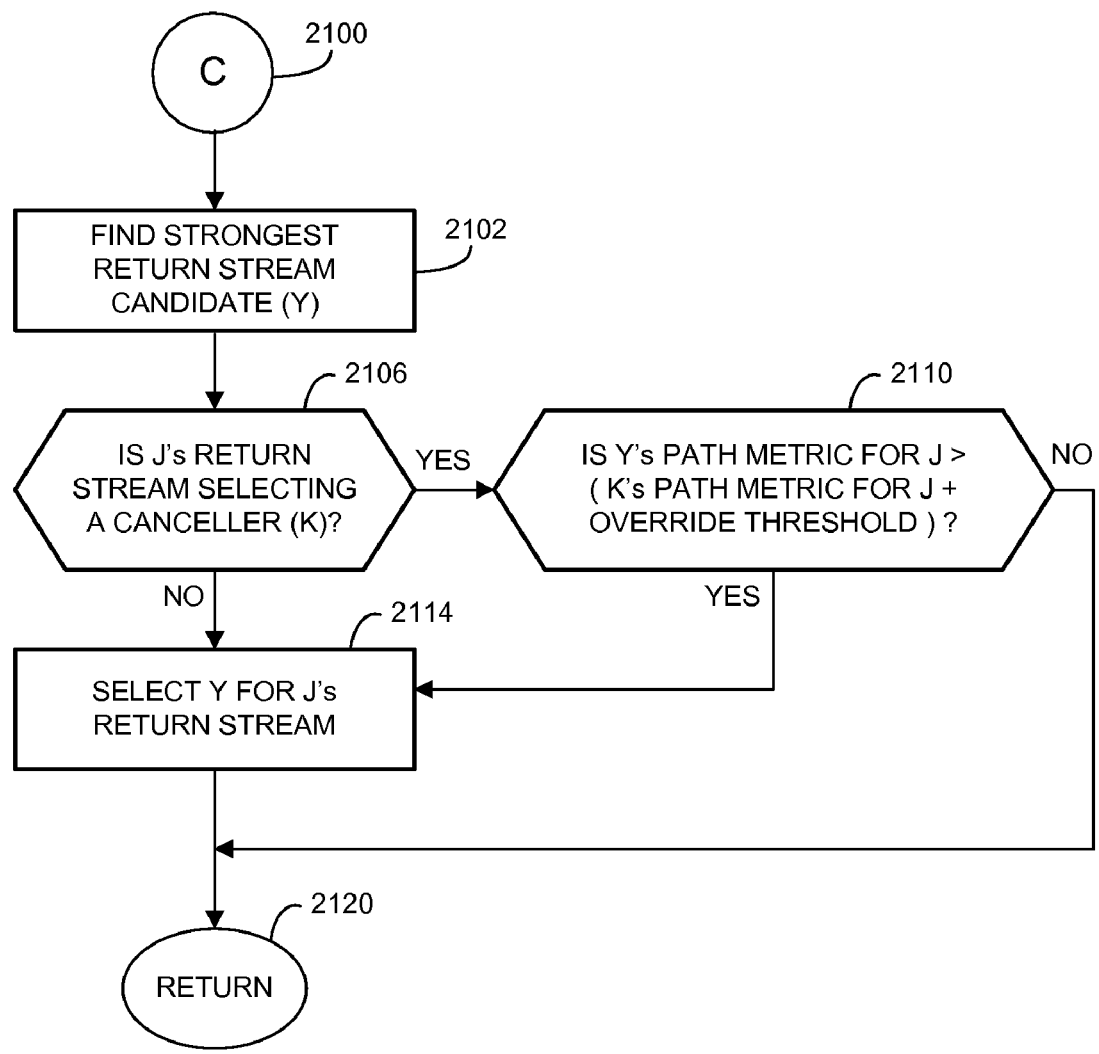
FIG. 21 shows an embodiment of the last stage for the RSS algorithm where return stream candidates are evaluated for selection.

FIGS. 19 to 21 show greater detail in the RSS algorithm. This algorithm may be used in embodiments where the interference cancellation or equalization being deployed is not sufficiently robust across the scenarios experienced, and offers a way to benefit from interference cancellation when the conditions permit. In other embodiments, the interference cancellation may be robust across scenarios, and there may not be a need to use the RSS algorithm for such implementations. This may also be useful where multiple types of advanced receivers are to process an incoming signal, and a decision is made based on the performance of the different receivers.

FIG. 19 illustrates an embodiment of the RSS algorithm for evaluating valid paths. A path is validated to indicate that it may be considered for interference cancellation signal stream selection. If a path is not validated, then interference cancellation signal streams are not considered and the raw signal stream is selected for the return stream of the path. The process starts with a signal from the RSS algorithm 1900 to evaluate all of the paths in the path list 260 (FIG. 2). Step 1904 starts with the first path in the path list and assigns the path to a variable J. Step 1908 determines if path J is enabled in the path list. If not, then the raw signal stream is selected for its return stream 1916. If path J is enabled then step 1912 determines if the path J's average pilot strength (from the path list) is above a minimum threshold. If not, step 1916 is executed. If it is, then the path has been validated and the algorithm move to stage B 1920. All paths in the path list are evaluated in the same manner (1930 and 1934) until no more paths are left to evaluate. At the point the RSS algorithm is done 1950.

FIG. 20 illustrates stage B of the RSS algorithm. In general, stage B builds a return stream candidate list 940 (FIG. 9) for a valid path. The return stream candidate list contains a list of possible interference cancellation signal streams 630 (FIG. 17) that can be considered for selection for a paths return stream 160 (FIG. 17). Also, this stage deselects an interference cancellation signal stream previously selected for a valid path, if it does not meet the algorithm's criteria.

The stage starts, for a given path J, by looking at each assigned canceller (K) 2002. (Unassigned cancellers do not produce an interference cancellation signal stream.) Step 2004 determines if path J is assigned to the canceller K. If so, the interference cancellation signal stream from canceller K is not useful for path J, since path J has been removed from the signal stream—this canceller is not considered for the return stream candidate list and the algorithm moves to evaluate the other assigned cancellers (2020 and 2024). If path J is not assigned to the canceller K, step 2006 is evaluated to determine if path J is already selecting canceller K's return stream. If so, canceller K's path metric list is used to determine if the pilot strength difference for path J is below a 'drop' threshold 2008. If so, the selection of K's signal stream is deselected for J and J's return stream selection is defaulted to the raw signal stream 2010. Step 2010 continues to evaluate other active cancellers 2020. At step 2008, if J's pilot strength difference was not below the 'drop' threshold, then other cancellers are evaluated for candidacy 2020.

At step 2006, if path J is not selecting the canceller K's signal stream, then canceller K's path metric (pilot strength difference) for path J is checked against an 'add' threshold. If the metric is above the 'add' threshold, then canceller K is assigned to the return stream candidate list for path J. If the metric is not above the threshold, then other assigned cancellers are evaluated 2020.

When all assigned cancellers have been evaluated, then return stream candidate list is complete for path J. Step 2024 determines if any candidates are present. If so, stage C 2030 is executed. If not, then stage B is done for path J and returns to 2040.

FIG. 21 shows an embodiment of stage C for the RSS algorithm where return stream candidates are evaluated for selection. Step 2102 finds the strongest return stream candidate (Y) for path J, e.g. the strongest pilot strength difference from the return stream candidates. Step 2106 identifies if path J is already selecting any canceller's signal stream. If not, then canceller Y's signal stream is selected for path J's return stream 2114. If path J is selecting a canceller's signal stream (K), then step 2110 is evaluated. (Stage B guarantees that K is not equal to Y.) Step 2110 determines if Y's pilot strength difference for J is greater than K's pilot strength difference for J, plus an 'override' threshold. If so, then step 2114 is executed. If not, stage C is done and returns to 2120.

In another embodiment of the return stream processing, no comparisons are made using the quality of interference cancelled signal. Instead, raw data continues to be used for use in downstream processing unless a fixed duration of time has passed since the assignment of rays to a given interference estimator.

In another embodiment, interference estimates are used only after a fixed duration (measured in time or number of symbols) has lapsed since the signals rays have been assigned to a given estimator. This allows for sufficient time for the filters assigned to the estimator to track the signal rays, and may help in preventing bad interference estimates from being produced which may degrade the quality of the interference cancelled signal.

It should be noted that in the preferred embodiment of the invention, the number (k) of advanced receiver units such as interference cancellers or equalizers would be matched to the expected number of signal sources for a given deployment. In this embodiment, it is possible to remove the interference of the strongest paths without wasting chip resources.

Figure 22:
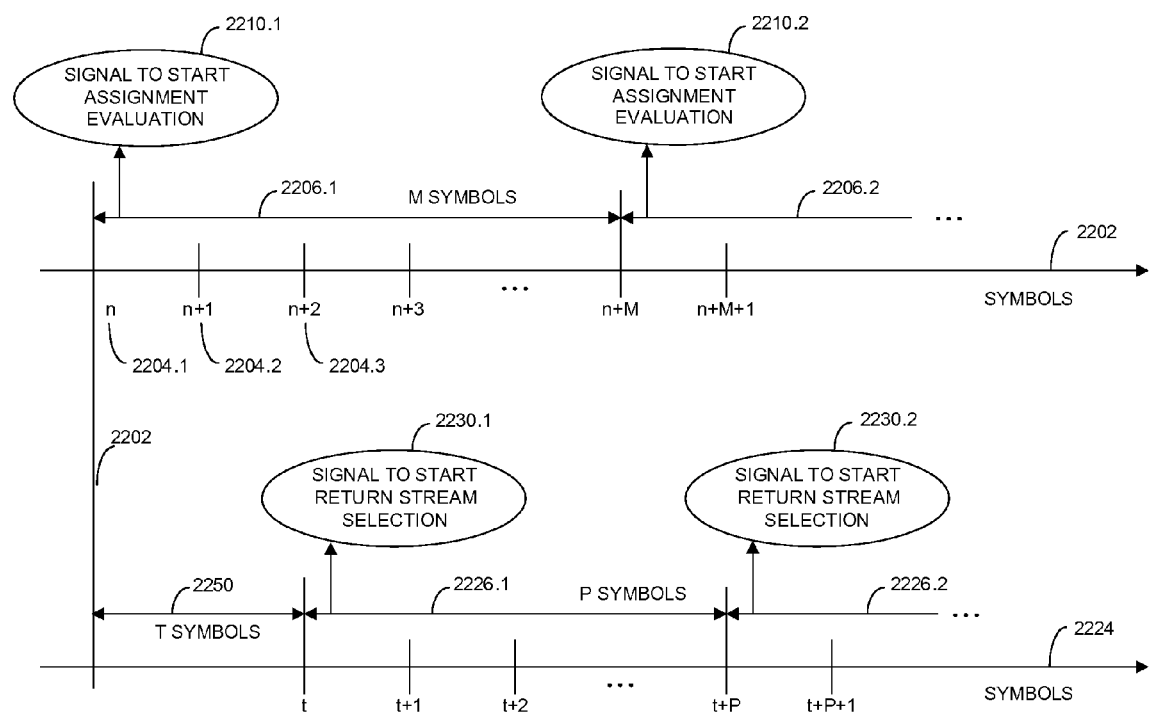
FIG. 22 is a diagram depicting a scheduler that generates execution signals for algorithms.

FIG. 22 illustrates a scheduler for executing signals within the advanced receiver module 130 (FIG. 1). The scheduler may execute on a generic symbol strobe generated within the advanced receiver module 2202. For each symbol strobe, the scheduler counts the symbols 2204.1, 2204.2, 2204.3, etc. Every M symbols 2206.1, the scheduler may issue a signal to start assignment evaluation 2210.1, 2210.2, etc. The symbol time line 2202 depicts an execution thread for assignment evaluation.

Another execution thread may be created 2224 for a signal to start return stream selection 2230.1. The two threads (2202 and 2224) may be offset in time by T symbols 2250. The signal to start return stream selection 2230.1 may be issued every P symbols 2226.1, 2226.2, etc.

The scheduler in FIG. 22 facilitates the embodiment of the cancellation module 130 (FIG. 1) in an environment where resources are limited. The execution signals may be interleaved and spread out in time to minimize the resources necessary to execute the algorithms.

Figure 23:
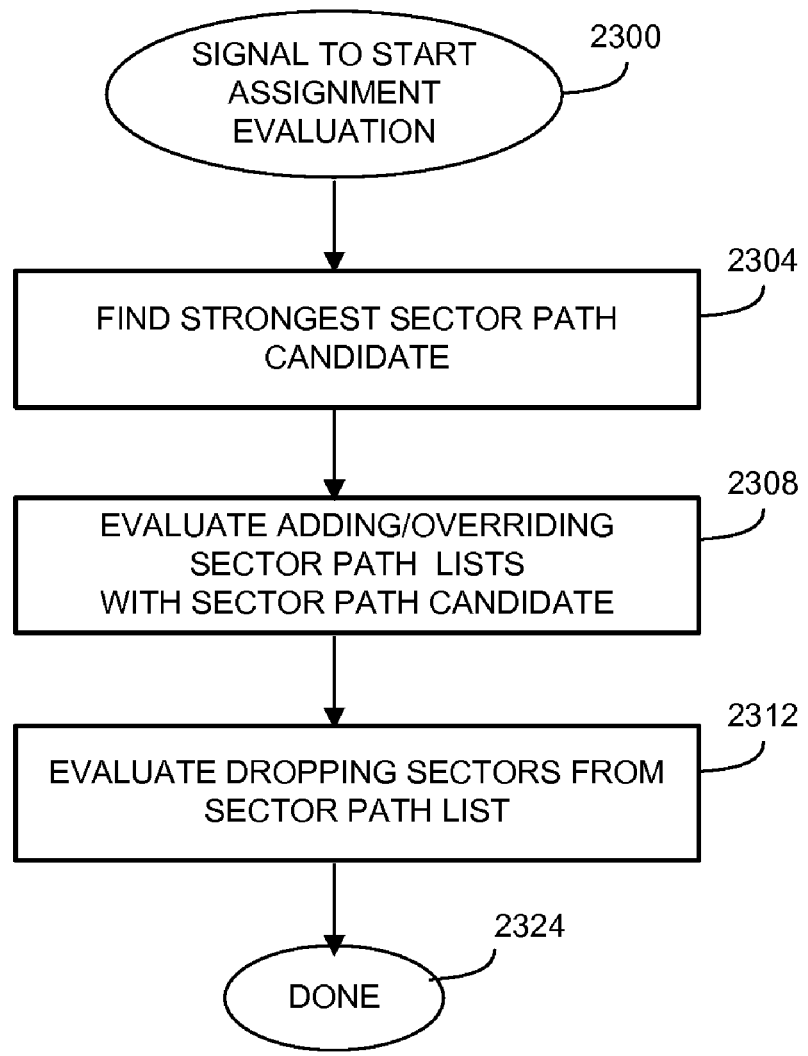
FIG. 23 is a flowchart illustrating an overview of another Assignment Controller algorithm where one path assignment is evaluated per execution FIG. 24 begins a detailed illustration of the assignment algorithm outlined in FIG. 23.

The assignment algorithm may also be reduced in complexity to facilitate an embodiment of the cancellation module in a limited resource environment. In one embodiment, FIG. 23 illustrates an overview of the assignment algorithm where only one sector is evaluated for assignment, every execution signal 2300. At step 2304 only one sector path candidate, if present, is evaluated for the purposes of being added to or overriding an existing sector in the sector path lists 2308. In the next step 2312, assigned advanced receiver units are evaluated to drop the sectors assigned to them.

Figure 24:
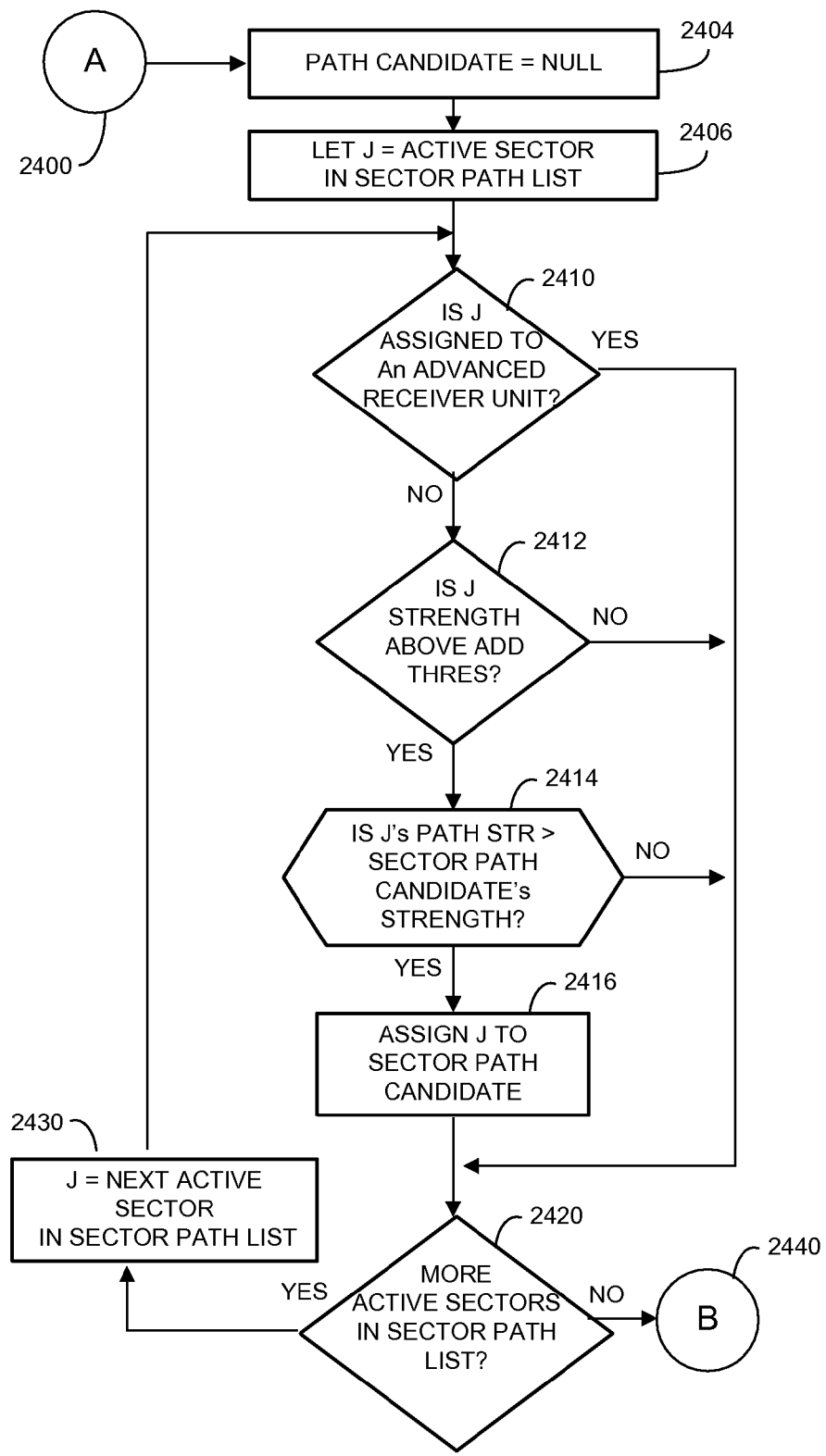

FIG. 24 begins a detailed illustration of the assignment algorithm outlined in FIG. 23. The execution signal 2300 (FIG. 23) starts stage A 2400 (FIG. 24). A path candidate variable is set to NULL 2404 indicating that, initially no sector candidate has been found. Next, all active sectors in the sector path list 220 (FIG. 2) are evaluated (steps 2406, 2420 and 2430). For each active path J, step 2410 determines if the path is already assigned to an advanced receiver. If so, it can not be a sector path candidate and the algorithm moves to step 2420. If the path is not already assigned to an advanced receiver module, such as an interference canceller, then J's average pilot strength, or a similar figure of merit, is tested against an 'add' threshold 2412. If J's strength is not above the threshold, then the path can not be a candidate. If it is above the threshold, then J's strength is compared to the sector path candidate's strength 2414. If J's strength is greater than the path candidate's strength, then J becomes the new path candidate 2416. If not, the next path is evaluated 2420.

When all active sectors have been evaluated, the path candidate variable may be NULL or contain the strongest active path. Stage B is executed next 2440.

Figure 25:
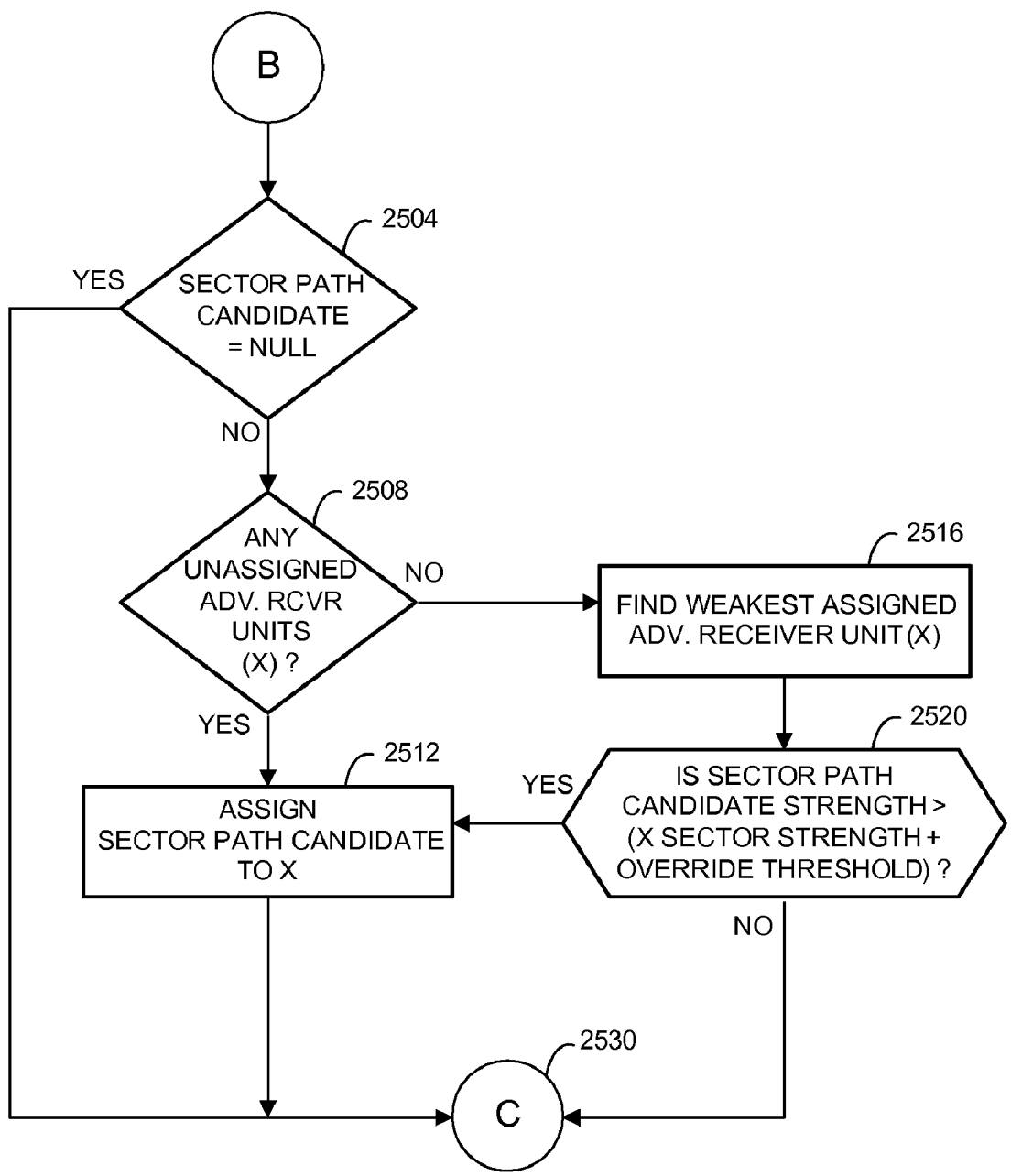
FIG. 25 shows another stage of the assignment algorithm.

FIG. 25 shows stage B of the assignment algorithm. Step 2504 determines if the sector path candidate variable is set to NULL, meaning that there are no active sectors in consideration for assignment to an advanced receiver unit. If so, then the algorithm moves to stage C 2530. If there is a sector path candidate, the advanced receiver units are evaluated to determine if one of them is unassigned 2508. An unassigned advanced receiver unit X is assigned the sector path candidate 2512, then the algorithm moves to stage C 2530. However, if all advanced receiver units are currently assigned, then the unit with the weakest pilot strength is chosen and assigned to variable X 2516. If the sector path candidate's pilot strength is greater then X's pilot strength plus an 'override' threshold 2520, then the sector path candidate is assigned to canceller X 2512 and X's old sector is unassigned. At step 2520, if the sector path candidate can not override the path assigned to X, then the algorithm moves to stage C 2530.

In another embodiment, an overriding assignment can only happen when a threshold criterion and a time criterion is met, wherein, the new candidate for assignment must be stronger than the currently assigned sector for at least some duration of time before the overriding operation can be performed.

Figure 26:
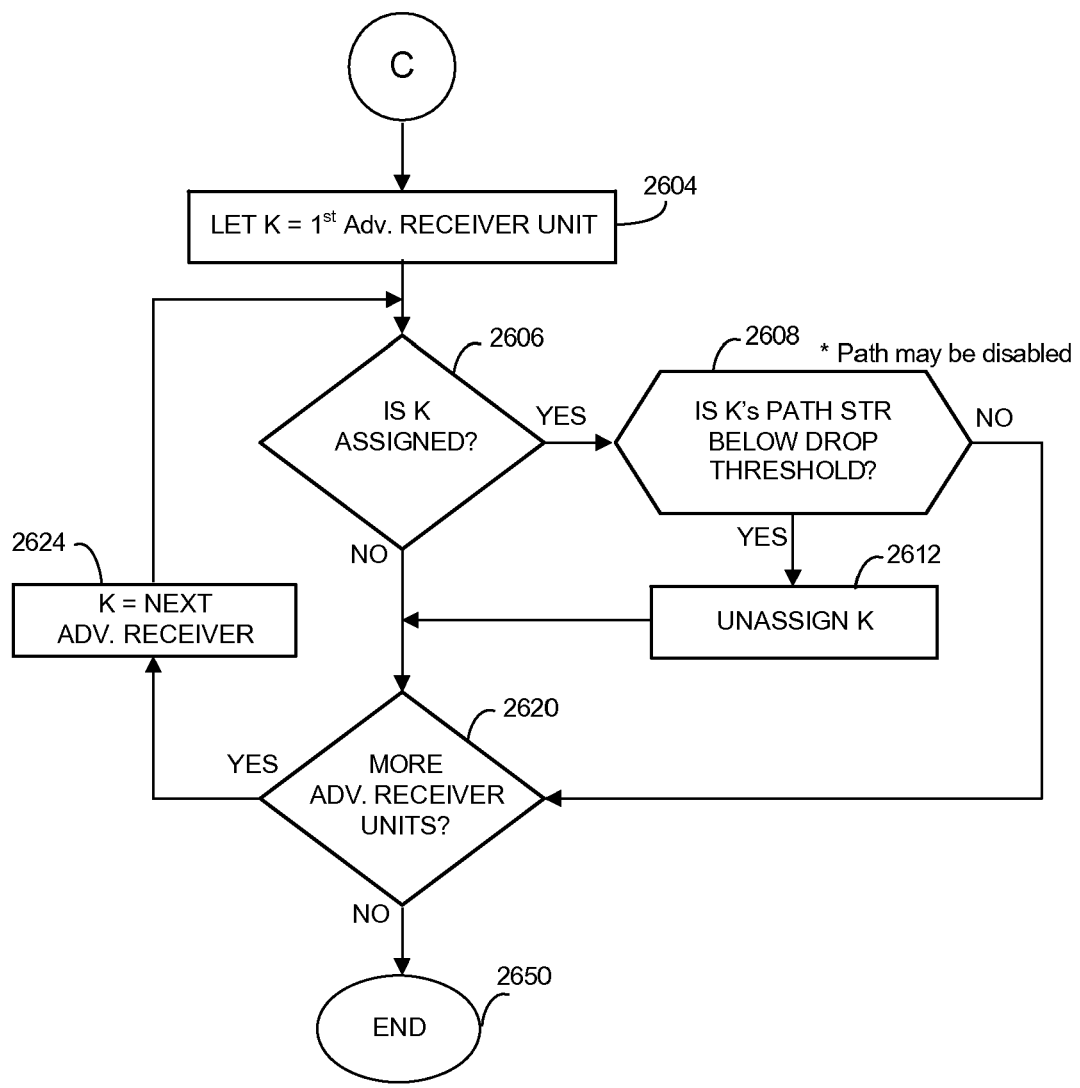
FIG. 26 illustrates the final stage of the assignment algorithm.

FIG. 26 illustrates stage C of the assignment algorithm. To start, cancellers are evaluated (steps 2604, 2620 and 2624). If an advanced receiver unit K is assigned 2606, then the sector's strength (assigned to K) is compared to a 'drop' threshold 2608. If less than the threshold, then the path assigned to K is unassigned 2612. If the sector's strength is greater than the threshold, then the algorithm evaluates the next advanced receiver unit 2620 for evaluation against a drop threshold. At this point the algorithm is done 2650.

Figure 27:
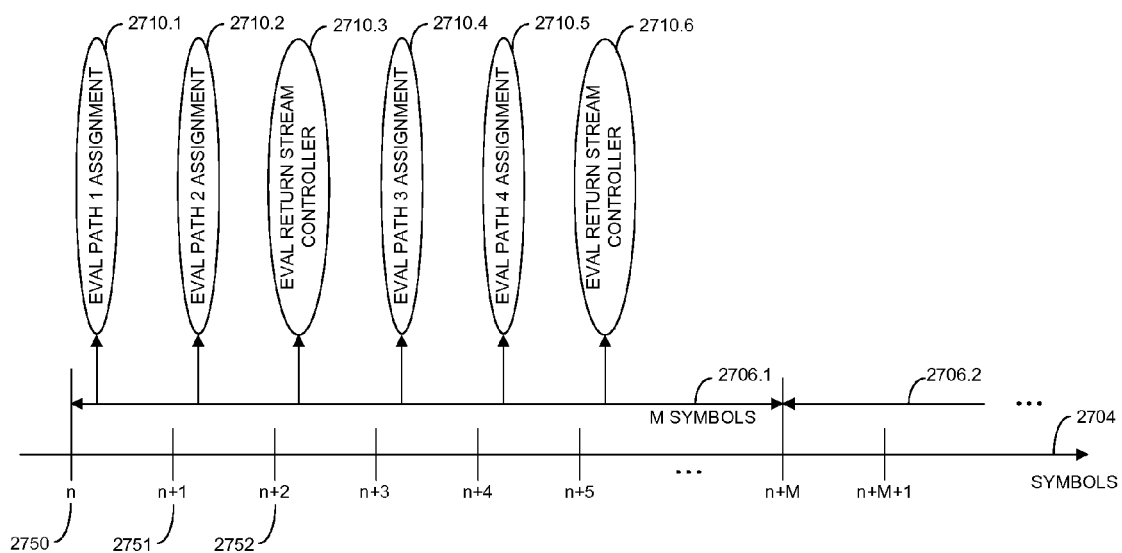
FIG. 27 is a diagram depicting another scheduler.

In another embodiment of the invention, a scheduler and assignment algorithm are implemented in an alternate manner to facilitate efficiency within a limited resource environment. FIG. 27 illustrates a scheduler (similar to the one described in FIG. 19) where symbol signals are counted and execution signals generated for algorithms (2710.1, 2710.2, etc). In this embodiment, there is only one execution thread 2704 with a periodic cycle of M symbols 2706.1. Also, the execution signals for the assignment algorithm 2710.1, 2710.2, 2710.4, and 2710.5 are structured to have the assignment algorithm evaluate a specified sector within the sector path list.

If a return stream selection is implemented, the scheduler may issue multiple execution signals for the return stream selection algorithm 2710.3 and 2710.6 within the M symbol period 2406.1. Also, the number of symbols between execution signals 2750, 2751, and 2752 may be greater than or equal to one symbol.

Figure 28:
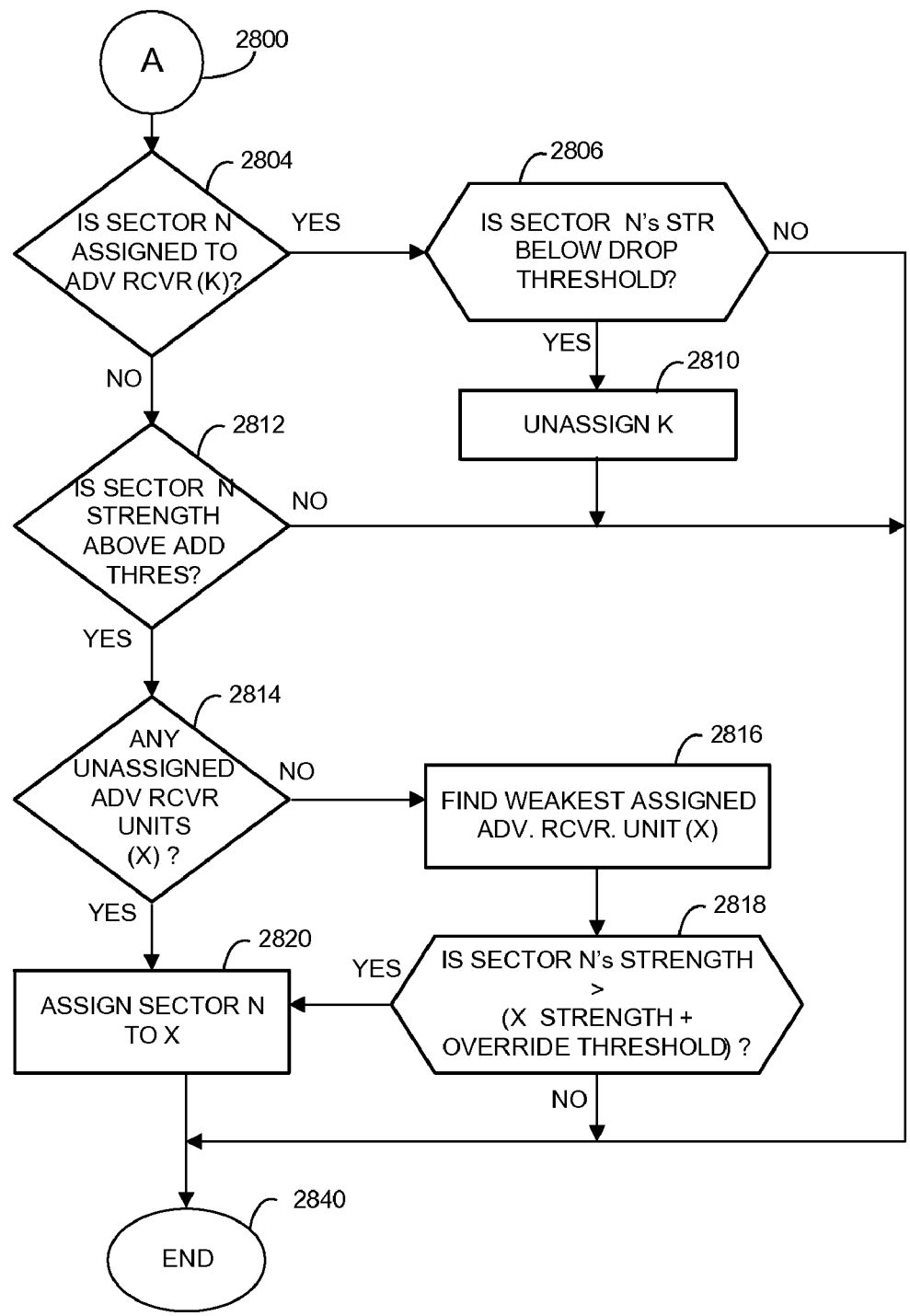
FIG. 28 shows a flowchart of the assignment algorithm that would run in conjunction with the scheduler illustrated in FIG. 27.

FIG. 28 shows a flowchart of the assignment algorithm that would run in conjunction with the scheduler illustrated in FIG. 27. When an execution signal is issued to evaluate sector N 2710.1, 2710.2, 2710.4, or 2710.5 (FIG. 27), the assignment algorithm starts by determining if sector N is assigned to an advanced receiver unit (K) 2804. If so, then sector N's pilot strength is compared to a drop threshold 2806. If less then the threshold, sector N is unassigned from the advanced receiver unit K 2810. If greater then the threshold, then the algorithm moves to the last steps 2840. At step 2804, if path N is not assigned to a canceller, then path N's pilot strength is compared to an 'add' threshold. If greater than the threshold, then the algorithm tries to find an unassigned advanced receiver unit (X) 2814. If X is found, then path N is assigned to advanced receiver unit X 2820. At step 2814, if an unassigned advanced receiver unit is not found, then the advanced receiver unit with the weakest sector strength is chosen and assigned to variable X 2816. If the sector strength is greater then X's strength plus an 'override' threshold 2818, then N is assigned to advanced receiver unit X 2820 and X's old sector is unassigned. At step 2818, if sector N cannot override the path assigned to X, then the algorithm moves to step 2840, where the loop is complete.

In another preferred embodiment of this invention, the controller detects the conditions of the scenario, and activates multiple iterations of the advanced receiver, in the event that there are fewer signal sources than what is designed for, and thereby may provide improved performance without an increase in complexity.

The contents of the sector path list are evaluated, and as an example, if the receiver is designed to handle symbol estimation for up to three interfering sources, and there is only a single Node-B or base station detected, the symbol estimation and interference construction resources may be used multiple times for the same source, thereby providing improved performance compared to a single iteration system.

The invention claimed is:

1. A receiver for signal processing, comprising:
a front-end processor for receiving a signal;
a searcher coupled to the front-end processor for detecting one or more signal paths in the signal;
a selection module for selecting at least one of the one or more signal paths for assignment to a symbol estimator and selecting at least one of a plurality of available sectors for use in interference cancellation or equalization;
a symbol estimator communicatively coupled to the selection module for generating one or more symbol estimates from the at least one of the one or more signal paths; and
a receiver module communicatively coupled to the symbol estimator for generating a substantially interference cancelled signal;
wherein the selection module further comprises at least one of an add threshold, a drop threshold and an override threshold.

2. The receiver in claim 1, wherein the selection module selects the one or more signal paths based at least in part on the strength of the one or more signal paths.

3. The receiver in claim 1, wherein the selection module selects the one or more signal paths sequentially.

4. The receiver in claim 1, wherein the selection module selects the one or more signal paths in parallel.

5. A receiver for signal processing, comprising:
a front-end processor for receiving a signal;
a searcher coupled to the front-end processor for detecting one or more signal paths in the signal;
a selection module for selecting at least one of the one or more signal paths for assignment to a symbol estimator and selecting at least one of a plurality of available sectors for use in interference cancellation or equalization;
a symbol estimator communicatively coupled to the selection module for generating one or more symbol estimates from the at least one of the one or more signal paths; and
a receiver module communicatively coupled to the symbol estimator for generating a substantially interference cancelled signal;
wherein each of the at least one of a plurality of available sectors continues to be used for symbol estimation unless at least one of an override threshold and a time of override is satisfied.

6. A method for processing a signal in a device, comprising;
assigning at least one signal path that is not intended for the device to a tracker;
generating tracking information from said at least one signal path; and
using the tracking information in a symbol estimator for at least one of equalization and cancellation.

7. A receiver for signal processing, comprising:
one or more processing modules each for operating on one or more signal streams to produce an output signal stream;
a selection module coupled to the one or more processing modules for selecting at least one of the output signal streams as a selected output signal stream; and
a post-processing module for producing one or more symbol estimates from the selected output signal stream.

8. The receiver in claim 7, wherein at least one of the one or more processing modules is an equalizer.

9. The receiver in claim 7, wherein at least one of the one or more processing modules is an interference canceller.

10. The receiver in claim 7, wherein the selection module selects at least one of the output signal streams as a selected output signal stream at least in part based on a figure of merit of the output signal stream.

11. The receiver in claim 7, where the selection module selects at least one of the output signal streams as a selected output signal stream at least in part based on a figure of merit of an input signal stream.

12. A receiver for signal processing, comprising:
a receiver for receiving one or more signal paths;
a signal metric evaluator coupled to a front end of the receiver for generating one or more signal metrics from the one or more signal paths;
a processor for selecting a receiver technique for processing the one or more signal paths based at least in part on at least one of the one or more signal metrics; and
a receiver module coupled to the processor for applying the receiver technique to at least one of the one or more the signal paths.

13. The receiver in claim 12, where the one or more signal metrics comprises strength, traffic statistics and geometry.

14. The receiver in claim 12, where the receiver technique is chosen from Rake, equalizer and interference canceller.

* * * * *